United States Patent
Ramos et al.

(10) Patent No.: US 12,093,606 B2
(45) Date of Patent: Sep. 17, 2024

(54) TECHNIQUES FOR RE-BONDING PLAYBACK DEVICES

(71) Applicant: Sonos, Inc., Santa Barbara, CA (US)

(72) Inventors: Maria-Jose Ramos, Seattle, WA (US); Jonathan Herbst, Seattle, WA (US); Justin A. Gallo, Watertown, MA (US); Ryan E. Kitson, Bay City, OR (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/498,578

(22) Filed: Oct. 31, 2023

(65) Prior Publication Data
US 2024/0061643 A1    Feb. 22, 2024

Related U.S. Application Data

(63) Continuation of application No. PCT/US2022/076398, filed on Sep. 14, 2022.

(60) Provisional application No. 63/245,082, filed on Sep. 16, 2021.

(51) Int. Cl.
G06F 3/16    (2006.01)

(52) U.S. Cl.
CPC .................................. *G06F 3/165* (2013.01)

(58) Field of Classification Search
None
See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |

(Continued)

FOREIGN PATENT DOCUMENTS

| EP | 1389853 A1 | 2/2004 |
| WO | 200153994 | 7/2001 |

(Continued)

OTHER PUBLICATIONS

International Search Report and Written Opinion of the International Searching Authority mailed Dec. 23, 2022 for International Application No. PCT/US2022/076398,12 pages.

(Continued)

*Primary Examiner* — Paul W Huber
(74) *Attorney, Agent, or Firm* — Finch & Maloney PLLC

(57) ABSTRACT

Disclosed herein are computing devices, including playback devices, that are configured to facilitate re-joining of playback and other devices to a bonded zone based on the specific context relating to how the playback and other devices previously left the bonded zone. The computing devices may determine that playback devices that had been previously bonded in the bonded zone are now capable of communicating with each other again. The computing devices may proceed to identify how and/or why the playback devices previously left the bonded zone. Based on how and/or why the playback devices previously left the bonded zone, the computing devices may determine whether one or more of the playback devices should re-join the bonded zone. For playback devices to be re-joined to the bonded zone, the computing devices may determine audio content to be played back by one or more playback devices of the bonded zone.

18 Claims, 17 Drawing Sheets

(56) References Cited

U.S. PATENT DOCUMENTS

| | | | |
|---|---|---|---|
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,903,526 | B2 * | 12/2014 | Beckhardt .......... H04N 21/8113 700/94 |
| 8,942,252 | B2 | 1/2015 | Balassanian et al. |
| 9,715,365 | B2 * | 7/2017 | Kusano .................. G05B 15/02 |
| 10,114,605 | B2 * | 10/2018 | Gossain .................. G06F 3/165 |
| 10,292,089 | B2 * | 5/2019 | Peters .................... H04W 48/08 |
| 10,565,999 | B2 * | 2/2020 | Wilberding ............. G10L 17/02 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2016/0342378 | A1 * | 11/2016 | Coburn, IV ....... H04N 21/4825 |
| 2016/0357503 | A1 | 12/2016 | Triplett et al. |
| 2017/0019742 | A1 * | 1/2017 | Rappoport ............. H04R 27/00 |
| 2021/0224026 | A1 * | 7/2021 | Kannan .................. G05B 15/02 |

FOREIGN PATENT DOCUMENTS

| | | | |
|---|---|---|---|
| WO | 2003093950 | A2 | 11/2003 |
| WO | 2020247811 | A1 | 12/2020 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Dec. 23, 2022, issued in connection with International Application No. PCT/US2022/076398, filed on Sep. 14, 2022, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

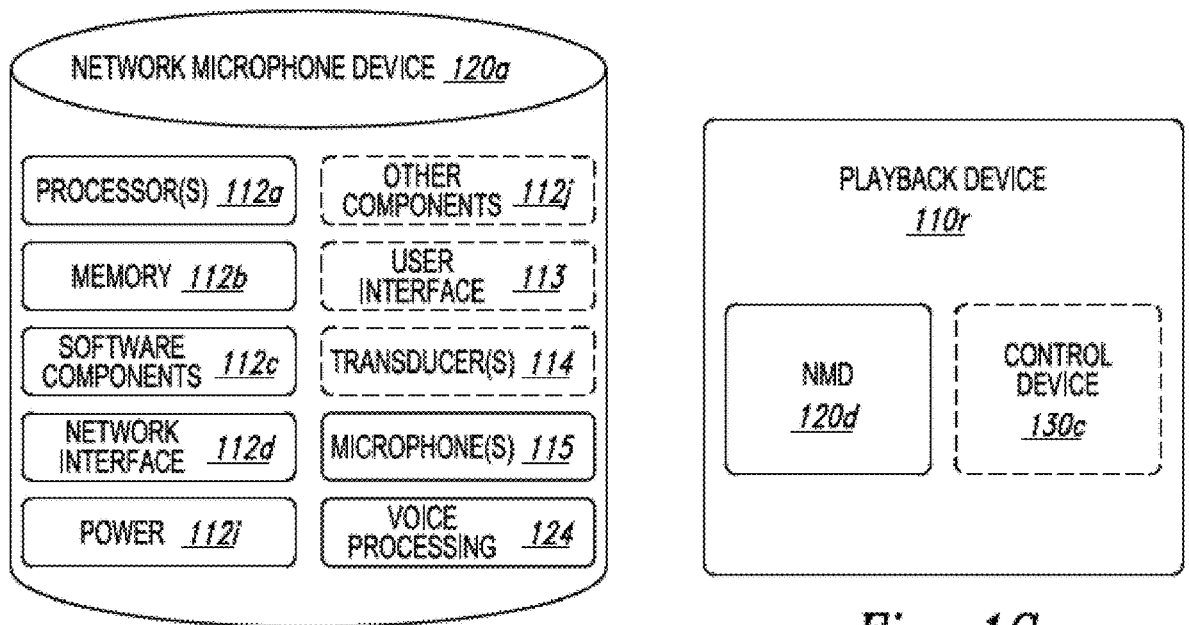
*Fig. 1F*
*Fig. 1G*
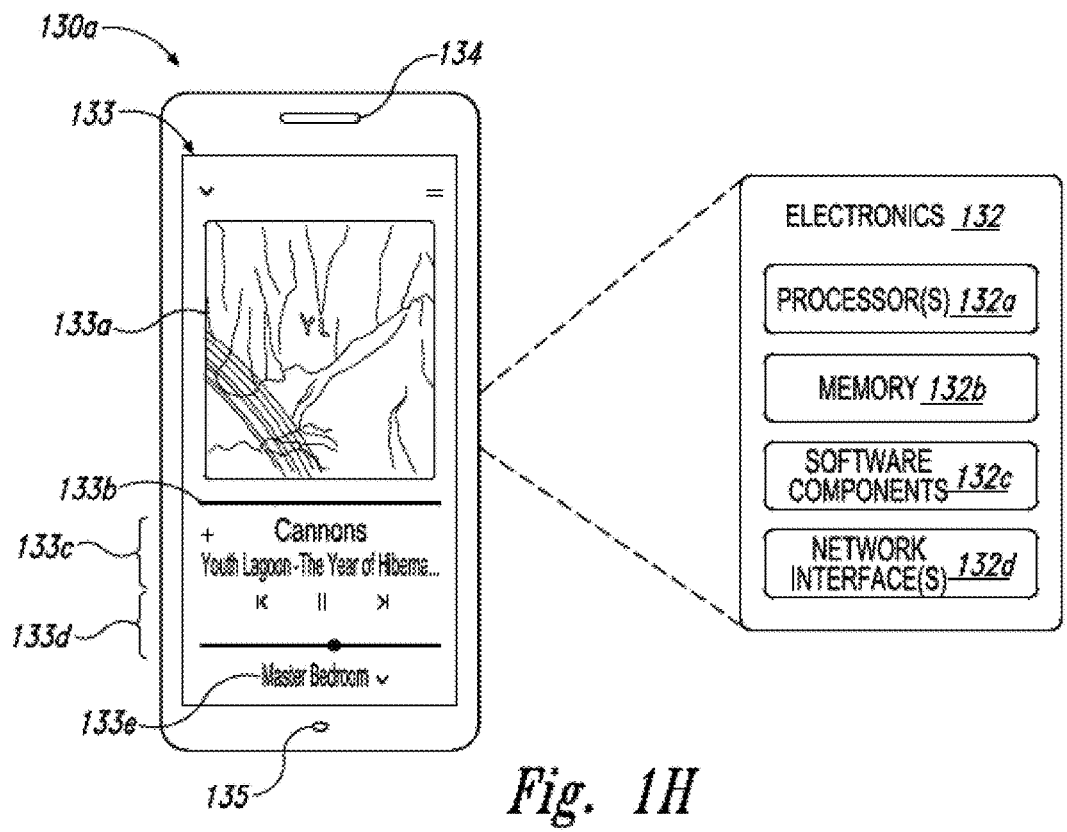
*Fig. 1H*

TECHNIQUES FOR RE-BONDING PLAYBACK DEVICES

CROSS-REFERENCE TO RELATED APPLICATIONS

This application is a continuation of and claims priority under 35 U.S.C. § 120 to co-pending International Application No. PCT/US2022/076398 filed on Sep. 14, 2022, which claims the benefits under 35 U.S.C. § 119(e) and Article 4 of the Paris Convention for the Protection of Industrial Property of U.S. Provisional Application No. 63/245,082, titled "Techniques for Re-Bonding Playback Devices" and filed on Sep. 16, 2021, each of which is hereby incorporated herein by reference in its entirety for all purposes.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

SUMMARY

Aspects and embodiments are directed to techniques for re-bonding playback devices in a media playback system.

According to one embodiment, a method for a first playback device comprises joining a bonded zone with a second playback device, while in the bonded zone with the second playback device, playing back audio content in synchrony with playback of the audio content by the second playback device, leaving the bonded zone with the second playback device, and after leaving the bonded zone: (i) detecting availability to communicate with the second playback device; (ii) identifying a cause for leaving the bonded zone with the second playback device; (iii) determining, based on the cause for leaving the bonded zone, whether to re-join the bonded zone with the second playback device; (iv) when it is determined that the first playback device is to re-join the bonded zone with the second playback device, re-joining the bonded zone with the second playback device and playing back audio content in synchrony with playback of the audio content by the second playback device.

In one example, playing back audio content in synchrony with playback of audio content by the second playback device comprises playing back one or more first channels of first audio content in synchrony with playback of one or more second channels of the first audio content by the second playback device.

In one example, the method further comprises preventing re-joining the bonded zone with the second playback device when the cause for leaving the bonded zone indicates that the first and second playback devices are not to re-join the bonded zone.

In another example, the method further comprises storing, by one of the first playback device, the second playback device, and a third device in communication with at least one of the first and second playback devices, a cause for leaving the bonded zone, wherein determining the cause for leaving the bonded zone comprises accessing the stored cause for leaving the bonded zone.

In another example, the method further comprises determining that the cause for leaving the bonded zone with the second playback device comprises one or more of (i) a powering down of the first playback device or the second playback device, (ii) a loss of a connection by the first playback device or the second playback device to a network, (iii) the bonded zone was separated by a user of the first or second playback device, (iv) a software update, (v) a depleted battery of the first playback device or the second playback device, (vi) the first playback device or the second playback device enter into a sleep mode, (vii) the first playback device and the second playback device are a threshold distance apart from each other, (viii) losing communication capability with the second playback device, or (ix) receiving an input from the user.

In another example, the method further comprises determining whether to re-join the zone with the second playback device based on whether the first playback device or the second playback device are currently playing back the first audio content, the second audio content, or other content.

In one example, the method further comprises determining whether to re-join the zone with the second playback device based on the zone comprising a bonded zone in which the first and second playback devices play back one or more first and one or more second channels of the audio content, respectively. The method may further comprise determining whether to re-join the zone based on the zone comprising a particular type of bonded zone including one of a stereo pair setup or a home theater setup.

In one example, the method further comprises determining a first voice assistant assigned to the first playback device and a second voice assistant assigned to the second playback device. In another example, the method further comprises, when the first and second playback devices are re-joined to the bonded zone, activating at least one of the first and second voice assistants.

In another example, the cause for leaving the bonded zone comprises one of: (i) removal of the first playback device from a first charging base, (ii) removal of the second playback device from a second charging base, or (iii) removal of both the first and second playback devices from the first and second charging bases respectively.

In another example, the method further comprises delegating playback of the second audio content if the first playback device leaves the bonded zone after re-joining the bonded zone.

In another example, the method further comprises playing back all channels of audio content alone after leaving the bonded zone and before re-joining the bonded zone with the second playback device.

In another example, the method further comprises determining, when the first or second playback devices are to re-join the bonded zone and when one or both of the first or second playback devices are playing back audio content, content to be played back in synchrony between the first and second playback devices.

Another embodiment is directed to a tangible, non-transitory computer-readable medium comprising instructions, which, when executed by one or more processors, causes a first playback device to be configured to cause a first playback device to perform a method of any of the examples discussed above.

According to another embodiment, a first playback device, comprises one or more amplifiers, one or more processors, and at least one non-transitory computer-readable medium comprising program instructions that are executable by the one or more processors such that the playback device is configured to perform a method of any of the examples discussed above.

According to another embodiment a first playback device comprises one or more amplifiers, one or more processors, and at least one non-transitory computer-readable medium comprising program instructions that are executable by the one or more processors such that the playback device is configured to: join a bonded zone with a second playback device, while in the bonded zone with the second playback device, play back one or more first channels of first audio content in synchrony with playback of one or more second channels of the first audio content by the second playback device, leave the bonded zone with the second playback device, after leaving the bonded zone: (i) detect availability to communicate with the second playback device; (ii) identify a cause for leaving the bonded zone with the second playback device; (iii) determine, based on the cause for leaving the bonded zone, whether to re-join the bonded zone with the second playback device; and (iv) when the first playback device is to re-join the bonded zone with the second playback device, re-join the bonded zone with the second playback device, and after re-joining the bonded zone, play back one or more first channels of second audio content in synchrony with playback of one or more second channels of the second audio content by the second playback device.

In one example, the tangible, non-transitory computer-readable medium further comprises instructions that are executable by the one or more processors such that the playback device is configured to prevent re-joining the bonded zone with the second playback device when the cause for leaving the bonded zone indicates that the first and second playback devices are not to re-join the bonded zone.

In another example, the tangible, non-transitory computer-readable medium further comprises instructions that are executable by the one or more processors such that the playback device is configured to determine that the cause for leaving the bonded zone with the second playback device comprises one or more of (i) a powering down of the first playback device or the second playback device, (ii) a loss of a connection by the first playback device or the second playback device to a network, (iii) the bonded zone was separated by a user of the first or second playback device, (iv) a software update, (v) a depleted battery of the first playback device or the second playback device, (vi) the first playback device or the second playback device enter into a sleep mode, (vii) the first playback device and the second playback device are a threshold distance apart from each other, (viii) losing communication capability with the second playback device, or (ix) receiving an input from the user.

In one example, the tangible, non-transitory computer-readable medium further comprises instructions that are executable by the one or more processors such that the first playback device is configured to determine whether to re-join the bonded zone with the second playback device based on whether the first playback device or the second playback device are currently playing back the first audio content, the second audio content, or other content.

In another example, the tangible, non-transitory computer-readable medium further comprises instructions that are executable by the one or more processors such that the first playback device is configured to determine whether to re-join the bonded zone with the second playback device based on a type of the bonded zone. In one example, the type of the bonded zone comprises a stereo pair setup or a home theater setup.

In another example, the tangible, non-transitory computer-readable medium further comprises instructions that are executable by the one or more processors such that the first playback device is configured to determine a first voice assistant assigned to the first playback device and a second voice assistant assigned to the second playback device. The tangible, non-transitory computer-readable medium may further comprise instructions that are executable by the one or more processors such that the first playback device is configured to (i) activate both the first and second voice assistants when the first and second playback devices are re-joined to the bonded zone, (ii) activate only the first voice assistant when the first and second playback devices are re-joined to the bonded zone, or (iii) activate only the second voice assistant when the first and second playback devices are re-joined to the bonded zone.

In another example, the tangible, non-transitory computer-readable medium further comprises instructions that are executable by the one or more processors such that the first playback device is configured to determine that the cause for leaving the bonded zone comprises (i) removal of the first playback device from a first charging base, (ii) removal of the second playback device from a second charging base, or (iii) removal of both the first and second playback devices from the first and second charging bases respectively.

In another example, the tangible, non-transitory computer-readable medium further comprises instructions that are executable by the one or more processors such that the first playback device is configured to delegate playback of the second audio content if the first playback device leaves the bonded zone after re-joining the bonded zone.

In one example, the tangible, non-transitory computer-readable medium further comprises instructions that are executable by the one or more processors such that the first playback device is configured to play back all channels of audio content alone after leaving the bonded zone and before re-joining the bonded zone with the second playback device.

In another example, the tangible, non-transitory computer-readable medium further comprises instructions that are executable by the one or more processors such that the first playback device is configured to determine, when the first or second playback devices are to be re-joined to the bonded zone and when one or both of the first or second playback devices are playing back audio content, content to be played back in synchrony between the first and second playback devices.

Another embodiment is directed to a tangible, non-transitory computer-readable medium comprising instructions, which, when executed by one or more processors, causes a first playback device to be configured to: join a bonded zone with a second playback device, while in the bonded zone with the second playback device, play back of one or more first channels of first audio content in synchrony with playback of one or more second channels of the first audio content by the second playback device, leave the bonded zone with the second playback device, after leaving the bonded zone: (i) detect availability to communicate with the second playback device; (ii) identify a cause for leaving the bonded zone with the second playback device; (iii) determine, based on the cause for leaving the bonded zone, whether to re-join the bonded zone with the second playback device; and (iv) when the first playback device is to re-join the bonded zone with the second playback device, re-join the bonded zone with the second playback device, and after re-joining the bonded zone, play back one or more first channels of second audio content in synchrony with playback of one or more second channels of the second audio content by the second playback device.

In one example, the instructions further cause the first playback device to be configured to automatically re-join the bonded zone with the second playback device if the cause for leaving the bonded zone was (i) a software update, (ii) receipt of a bye bye command associated with leaving the bonded zone, or (iii) establishment of a BLUETOOTH line-in connection by the first playback device, the second playback device, or both. The instructions may further cause the first playback device to be configured to maintain separation from the bonded zone if (i) a bye bye message is not received and (ii) a topology timeout occurred.

In one example, the instructions further cause the first playback device to be configured to pause playback of the second audio content if either the first playback device or the second playback device leaves the bonded zone after the first playback device re-joined the bonded zone. The instructions may further cause the first playback device to be configured to resume playback of the second audio content if the first playback device and second playback device are re-joined to the bonded zone after either the first playback device or the second playback devices leaves the bonded zone.

In another example, the instructions further cause the first playback device to be configured to facilitate adjustment of a setting dictating a condition for determining whether to re-join the bonded zone with the second playback device.

In another example, the instructions further cause the first playback device to be configured to leave the bonded zone based on an occurrence of a condition specified by (i) the first playback device, (ii) the second playback device, (iii) or both.

In another example, the instructions further cause the first playback device to be configured to receive priority associated with playback of the first audio content over the second playback device based on the first playback being a primary playback device.

In another example, the instructions further cause the first playback device to be configured to leave the bonded zone when either the first or second playback devices connect with a third device not belonging to the bonded zone.

According to another embodiment, a method performed by a first playback device comprises joining a bonded zone with a second playback device, while in the bonded zone with the second playback device, playing back one or more first channels of first audio content in synchrony with playback of one or more second channels of the first audio content by the second playback device, leaving the bonded zone with the second playback device, after leaving the bonded zone: (i) detecting availability to communicate with the second playback device; (ii) identifying a cause for leaving the bonded zone with the second playback device; (iii) determining, based on the cause for leaving the bonded zone, whether to re-join the bonded zone with the second playback device; and (iv) when the first playback device is to re-join the bonded zone with the second playback device, re-joining the bonded zone with the second playback device, and after re-joining the bonded zone, playing back one or more first channels of second audio content in synchrony with playback of one or more second channels of the second audio content by the second playback device.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

Figure 1A:
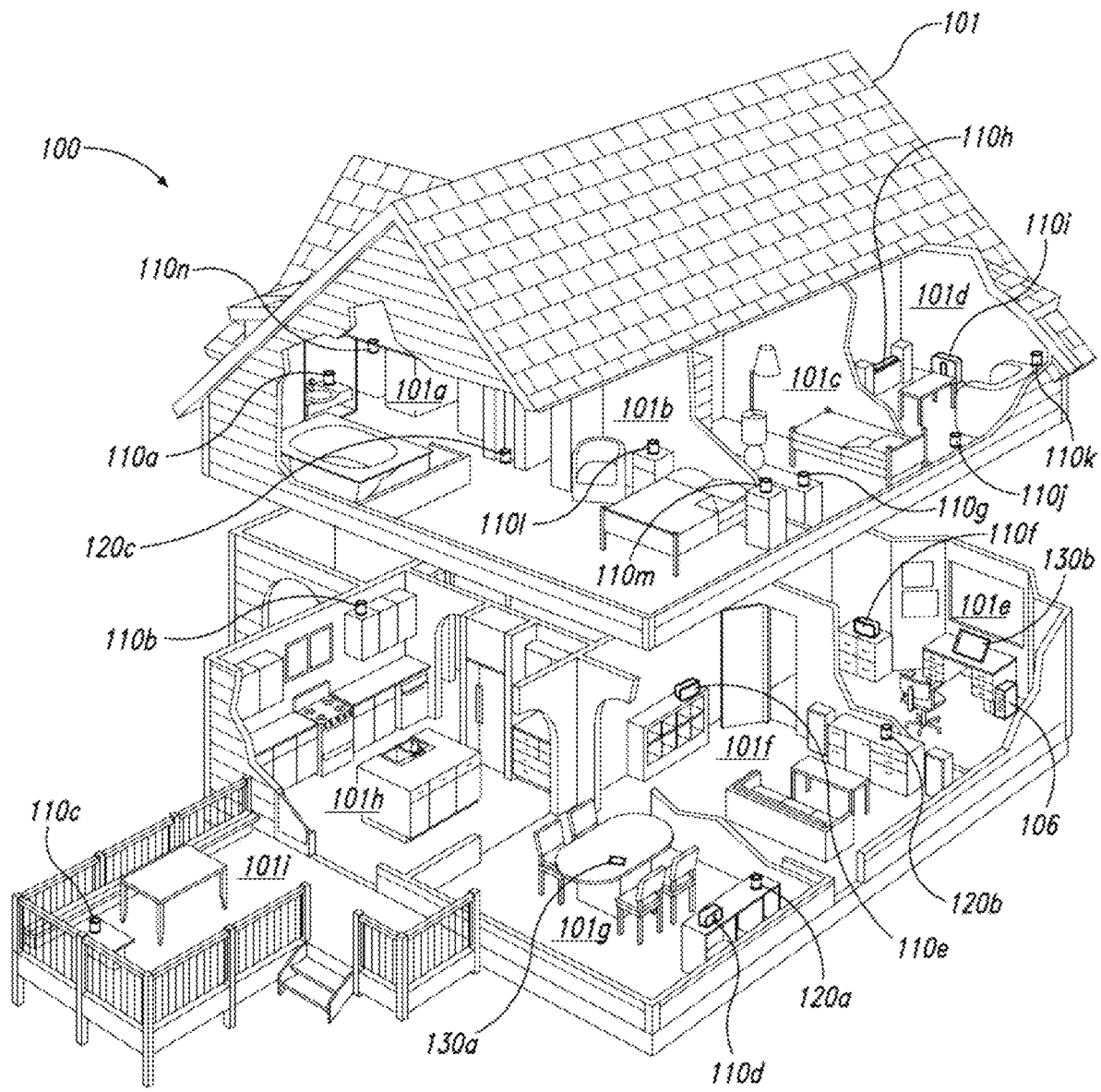
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Sonos, Inc. has been a consistent innovator and leader in the sound experience space over the years. For example, Sonos, Inc. created stereo pair functionality for playback devices that allows two playback devices to be bonded together to form a stereo pair as described in U.S. Pat. No. 8,788,080, issued on Jul. 22, 2014, titled "MULTI-CHANNEL PAIRING IN A MEDIA SYSTEM," which is incorporated herein by reference in its entirety. After creating stereo pair functionally, Sonos, Inc. went on to create dynamic grouping functionality for playback devices as described in U.S. Pat. No. 9,329,831, issued on May 3, 2016, titled "PLAYBACK EXPANSION," which is incorporated herein by reference in its entirety. In furtherance of the consistent innovation by Sonos, Inc. in the sound experience space, Sonos, Inc. developed techniques for intelligently distributing audio between playback devices based on information about current operating conditions, such as information regarding a configuration of the players and/or user preferences, to further improve the sound experience in dynamic environments (e.g., households, venues, businesses, etc.) employing, for example, portable players (e.g., being moved relative to each other) and/or a combination of stationary players and portable playback devices (e.g., being moved relative to each other and/or the stationary players) in PCT/US20/36409, filed on Jun. 6, 2020, titled "AUTOMATICALLY ALLOCATING AUDIO PORTIONS TO PLAYBACK DEVICES," which is incorporated by reference in its entirety.

In PCT/US20/36409, aspects of the disclosure relate to automatically allocating audio portions (e.g., audio channels, frequency ranges, etc.) in response to a detected trigger and based on retrieved configuration information. For example, a portable playback device can be moved to different locations within a playback system. As the portable playback device changes position, the audio that it is desired to reproduce may also change. While the portable playback device may be reconfigured manually each time it is moved to a new location, this is inconvenient, potentially requiring access to a separate control device and/or interrupting the reproduction of any media. The configuration can also be complex, involving not just grouping playback devices to play media in synchrony, but adjusting audio allocations between those devices. Audio allocation can be based on one or more channels (such as a left channel, a right channel, etc.) and frequency ranges (such as low frequencies below a predetermined threshold, other frequencies above the predetermined threshold, etc.). Accordingly, aspects of the disclosure relate to automatic configuration of such audio allocation for an improved user experience. For example, techniques are described therein to update the audio allocation responsive to a trigger being detected based on retrieved configuration information to inform the audio allocation. In this way, audio allocations can be updated without requiring user input to provide an improved user experience.

Building upon the prior innovations described above, Sonos, Inc. has developed innovative technologies described herein to enhance the user's experience by providing a re-bonding experience where, in certain situations, the playback devices and other related devices that were previously bonded to each other will automatically re-bond, such as in a bonded zone or zone group. When playback devices and/or other devices are joined to a bonded zone, the playback devices and/or other devices may be configured to play back the same or similar audio content in synchrony from one or more audio content sources. For example, in certain embodiments, a bonded zone may include a first playback device and a second playback device that comprise left audio and right audio channels, respectively, of multi-channel audio content, thereby producing or enhancing a stereo effect of the audio content.

Currently, for example, when stereo-paired playback devices that belong to a bonded zone become unavailable, go offline, or establish connections with devices outside the bonded zone, the bond between the playback devices is permanently broken. As a result, when a user wishes to re-join the playback devices in the bonded zone to form the stereo pair on a subsequent occasion, the user has to proceed through the entire stereo pair setup process again, such as by utilizing a controller application configured to re-bond and control the playback devices. Having to regularly go through the stereo pair setup process when playback devices leave a bonded zone and then re-join the bonded zone is problematic not only from an inconvenience perspective, but also given the variety of conditions that cause the playback devices to leave the bonded zone in the first place. For example, one or more playback devices may leave a bonded zone for a variety of reasons, including, but not limited to, a powering down of a playback device, a low battery level for a battery of a playback device, a restart during a software update for software associated with the playback device, movement of a playback device outside a communication range (e.g., outside a range of communication for a Wireless Local Area Network (WLAN)) for communicating with another playback device in the bonded zone, among other reasons.

Some embodiments of the playback devices and systems described herein improve upon the various shortcomings of existing playback devices and systems by facilitating automatic re-bonding of playback and/or other devices to a bonded zone based on the occurrence of specific conditions and based on the context of the situation relating to the departure of the playback and/or other devices from the bonded zone and/or re-joining the bonded zone. To that end, the playback devices and systems may keep a record of the way in which the bond to the bonded zone was broken and utilize related information to determine whether the playback devices should be re-joined to the bonded zone when the playback devices are able to re-establish communication with each other. For example, if two playback devices are joined together in a bonded zone as a stereo pair and the bond between them was broken because one of the playback devices powered down, one or both of the playback devices may record the reason for the bond being broken. In such a scenario, the playback devices and systems described herein may cause the playback devices that were previously bonded in the bonded zone to re-join the bonded zone when the playback devices are both able to communicate with each other (e.g., both playback devices are connected to the same WLAN).

As another example, two playback devices that are in a bonded zone as a stereo pair may have the bond between them broken because of a loss of a WLAN connection by one of the playback devices (e.g., one of the playback devices was taken outside the range of the WLAN). In such a scenario, the playback devices and systems may not automatically re-join the playback devices to the bonded zone when the playback devices come back into communication range with each other. In some embodiments, the playback devices and systems may utilize additional information when determining whether to re-join playback and/or other devices to a bonded zone. For example, such additional information may include, but is not limited to, (i) an indication of which playback device(s) are playing back audio content at the time when the playback devices come back into communication (e.g., are the playback devices playing back two separate streams, are one or both of the playback devices idle, etc.); (ii) an indication as to the type of bonded zone that the playback devices were a part of (e.g., whether the bonded zone a stereo pair setup, home theater setup, or other type of setup); (iii) an indication as to the context relating to the bond being broken between the playback devices; (iv) an indication as to actions being performed with respect to the playback devices; and/or (v) and other factors.

In some embodiments, the playback devices and systems may facilitate re-bonding of playback devices to a bonded zone based on the following exemplary process. Initially, in such embodiments of the process, the playback devices and systems may detect and/or determine that playback devices that were previously joined together in a bonded zone are currently capable of communicating with each other again. The playback devices and systems may proceed to identify the cause for the previous unbonding of the playback devices from the bonded zone. Based on the cause for the previous unbonding from the bonded zone, the playback devices and systems may determine whether the playback devices are to re-join the bonded zone. If the playback devices and systems are to re-join the bonded zone, the playback devices and systems may determine what content that the playback devices are to play back once the playback devices are re-joined to the bonded zone. In some embodiments, if each of the playback devices is already playing back content prior to re-joining the bonded zone, the playback devices and systems may determine that content from one of the playback devices should be played back by the other playback devices re-joining the bonded zone. For example, the playback devices and systems may determine that one or more first channels of audio content should be played back by a first playback device in synchrony with playback of one or more second channels of the same audio content by a second playback device.

In some embodiments, the present disclosure may provide a playback device configured to perform some or all of the operative functionality and techniques described herein. In some embodiments, the playback device may be a first playback device of a plurality of playback devices. The first playback device may include one or more amplifiers, any number of playback device componentry (e.g., microphones, speakers, and the like), one or more processors, and at least one non-transitory computer-readable medium comprising instructions that may be executed by the processor(s) such that the playback device is configured to perform various operations supporting the functionality described in the present disclosure. For example, the playback device may be configured to join a bonded zone with a second playback device (or any number of other playback devices and/or other devices). In some embodiments, the bonded zone may comprise having the playback device form a stereo pair with the second playback device, having the playback device form a home theater setup with the second playback device, having the first playback device form a zone or group with the second playback device, and/or having the first playback device form any type of bond with the second playback device.

While the first playback device is in the bonded zone with the second playback device, the first playback device may be configured to play back any number of first channels of first audio content (e.g., music content and/or any other type of content) in synchrony with playback of one or more second channels of the first audio content by the second playback device. As the first audio content is being played back or at the conclusion of playing back the first audio content (or at any other desired time), the first playback device may be configured to leave the bonded zone with the second playback device. The first playback device may be configured to leave the bonded zone for any number of reasons, such as, but not limited to, (i) a powering down of the first playback device; (ii) a user moves the first playback device outside the range of a WLAN (or other network) utilized to bond the first playback device to the second playback device; (iii) the user lifts the first playback device off of a charging base; (iv) the user breaks the bond between the first and second playback devices using a controller for controlling the first and/or second playback devices (e.g., such as via a software application executing on a mobile device); (v) the first playback device switches to a different communication mode and/or connects with another device (e.g., the first playback device switches to a BLUETOOTH pairing mode); (vi) the first playback device loses power or the battery level is below a threshold value; (vii) a software update for updating software of the first playback device occurs; (viii) a restart of the first playback device occurs; (ix) the first playback device enters a sleep mode or is inactive for a threshold amount of time; and (x) any other reason for leaving the bonded zone.

Once the first playback device has left the bonded zone with the second playback device, the first playback device may be configured to detect availability to communicate with the second playback device. In some embodiments, the first playback device may then be configured to identify a cause for leaving the bonded zone with the second playback device. Based on the determined cause for leaving the bonded zone, the first playback device may be configured to determine whether to re-join the bonded zone with the second playback device. If it is determined that the first playback device is to re-join the bonded zone with the second playback device based on the cause for leaving the bonded zone previously, the first playback device may be configured to re-join the bonded zone with the second playback device. In some embodiments, for example, when the first playback device is re-joined to the bonded zone with the second playback device the first and second playback devices may form a stereo pair or a home theater pair. After re-joining the bonded zone, the first play back device may be configured to play back any number of first channels of second audio content in synchrony with playback of one or more second channels of the second audio content by the second playback device. In some embodiments, while re-joined to the bonded zone, the first and/or second playback devices may be configured to perform any number of other types of actions in synchrony.

In addition to providing playback devices capable of performing the operative functionality of the present disclosure, a tangible, non-transitory computer-readable medium comprising instructions, which, when executed by one or more processors, may cause a first playback device to be configured to perform various operations according to some embodiments. For example, the instructions from the non-transitory computer-readable medium may cause the first playback device to join a bonded zone with a second playback device, and, while in the bonded zone with the second playback device, play back of one or more first channels of first audio content in synchrony with playback of one or more second channels of the first audio content by the second playback device. In some embodiments, the instructions may cause the first playback device to leave the bonded zone with the second playback device. After leaving the bonded zone, the instructions may be configured to cause the first play back device to (i) detect availability to communicate with the second playback device; (ii) identify a cause for leaving the bonded zone with the second playback device; (iii) determine, based on the cause for leaving the bonded zone, whether to re-join the bonded zone with the second playback device; and (iv) when the first playback device is to re-join the bonded zone with the second playback device, re-join the bonded zone with the second playback device. After re-joining the bonded zone, the instructions may be configured to cause the first playback device to play back one or more first channels of second audio content in synchrony with playback of one or more second channels of the second audio content by the second playback device.

In some embodiments, the present disclosure may include methods for facilitating the operative functionality described herein. In some embodiments, the methods may be performed by playback devices, computing systems, any other devices, or a combination thereof. By way of example, a sample method may be performed by a first playback device. The method may include having the first playback device join a bonded zone with a second playback device. While in the bonded zone with the second playback device, the method may include having the first playback device play back one or more first channels of first audio content in synchrony with playback of one or more second channels of the first audio content by the second playback device. The method may include having the first playback device leave the bonded zone with the second playback device. After the first playback device has left the bonded zone, the method may include having the first playback device (i) detect availability to communicate with the second playback device; (ii) identify a cause for leaving the bonded zone with the second playback device; (iii) determine, based on the cause for leaving the bonded zone, whether to re-join the bonded zone with the second playback device; (iv) re-join the bonded zone with the second playback device when the first playback device is to re-join the bonded zone with the second playback device. After the first playback device rejoins the bonded zone with the second playback device, the method may include having the first playback device play back one or more first channels of second audio content in synchrony with playback of one or more second channels of the second audio content by the second playback device.

In some embodiments, the playback devices and systems disclosed herein may be configured to have further capabilities and functionality. In some embodiments, for example, two different playback devices may have different voice assistants assigned to them and a determination may be made that the playback devices should be bonded/re-bonded to a bonded zone. In some embodiments, both players may activate all of the voice assistants (e.g., both playback devices now are running all voice assistants), have voice assistants of the playback devices operate as they were separately (e.g., one playback device runs one voice assistant and the other portable runs the other voice assistant), or have one voice assistant be selected over the other voice assistant (e.g., all playback devices in the bonded zone run the same voice assistant). In certain embodiments, the playback devices and systems may include treating Sonos, Inc. voice assistants differently from voice assistants provided by other companies (e.g., third-party VAs).

Based on at least the foregoing, the features and functionality provided by the playback devices and systems described herein serve to provide a more dynamic, seamless, and user-friendly approach to enabling playback devices and/or other devices to re-join a bonded zone. As a result, the playback devices and systems described herein provide a level of convenience, peace-of-mind, and functionality to users of playback devices that is greater than what is currently possible with existing devices and systems.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
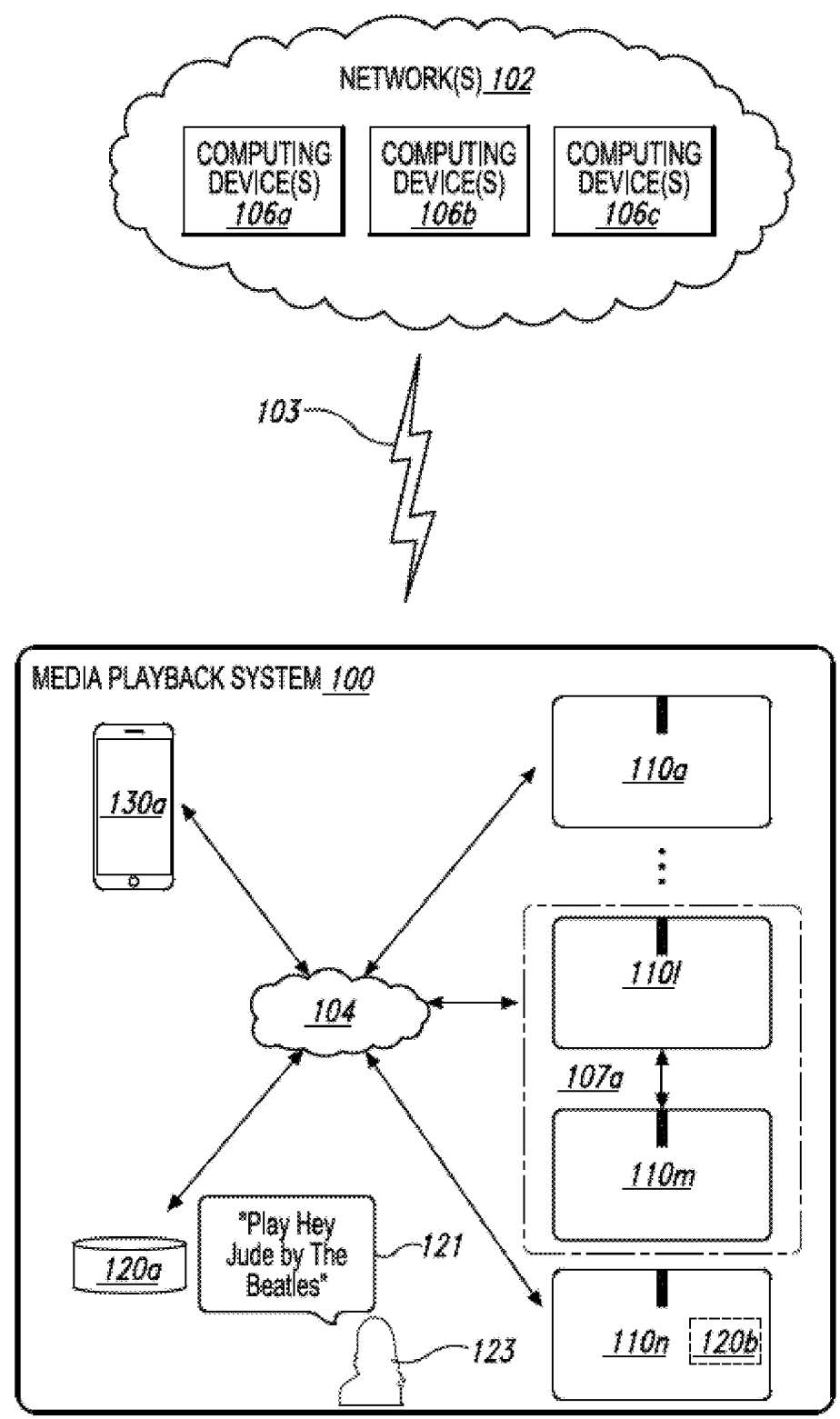
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WI-FI network, a BLUETOOTHBLUETOOTH, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WI-FI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11 ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WI-FI network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1I through IM.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS, AMAZON, GOOGLE, APPLE, MICROSOFT). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
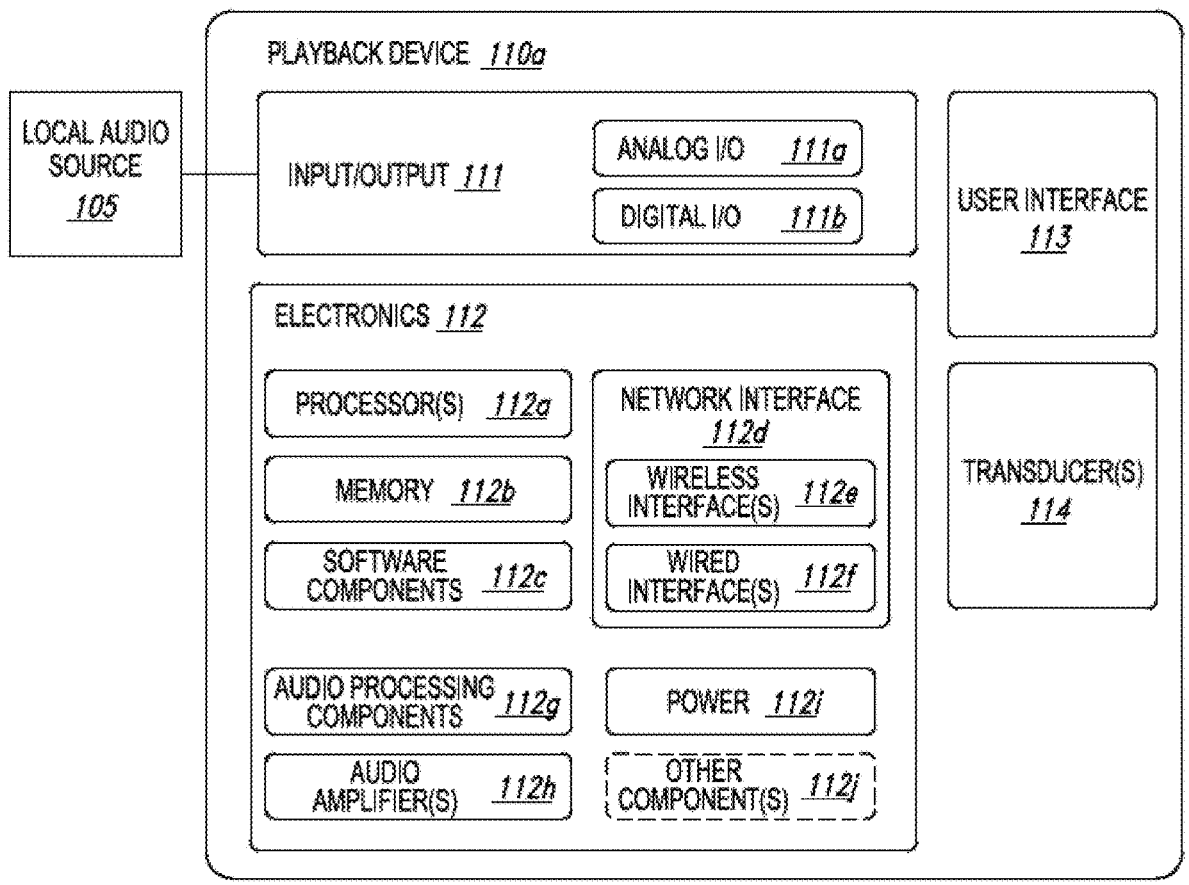
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WI-FI, BLUETOOTH, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WI-FI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
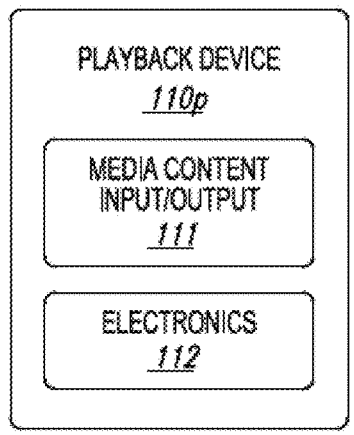
FIG. 1D is a block diagram of a playback device.

By way of illustration, Sonos, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to Sonos product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
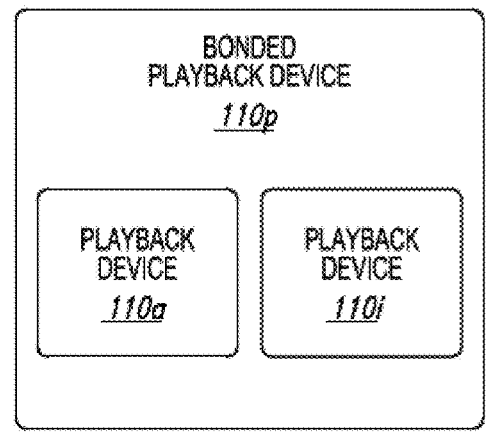
FIG. 1E is a block diagram of a bonded playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 112*h*, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON VAS, a user might speak the activation word "Alexa." Other examples include "Ok, Google" for invoking the GOOGLE VAS and "Hey, Ski" for invoking the APPLE VAS.

After detecting the activation word, voice processing 124 monitors the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a SONOS playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132b can comprise data storage that can be loaded with one or more of the software components executable by the processor 132a to perform those functions. The software components 132c can comprise applications and/or other executable software configured to facilitate control of the media playback system 100. The memory 132b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
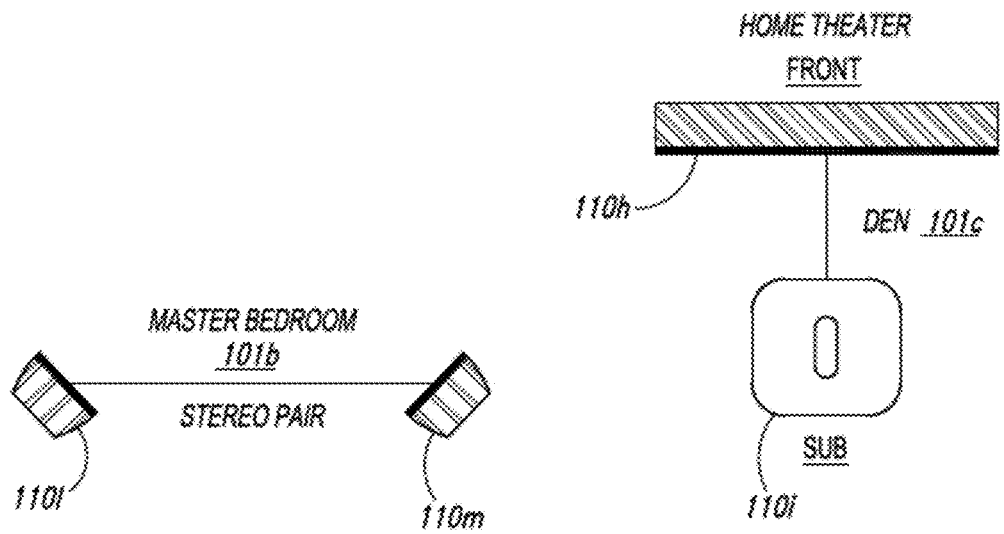
FIGS. 1I through 1L are schematic diagrams of corresponding media playback system zones.
Figures 1K, 1L:
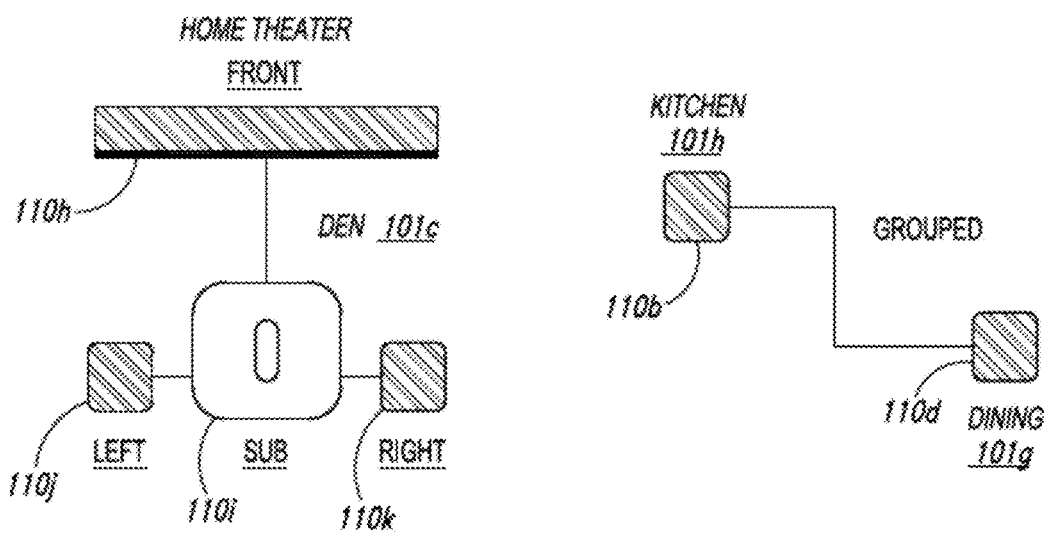
Figure 1M:
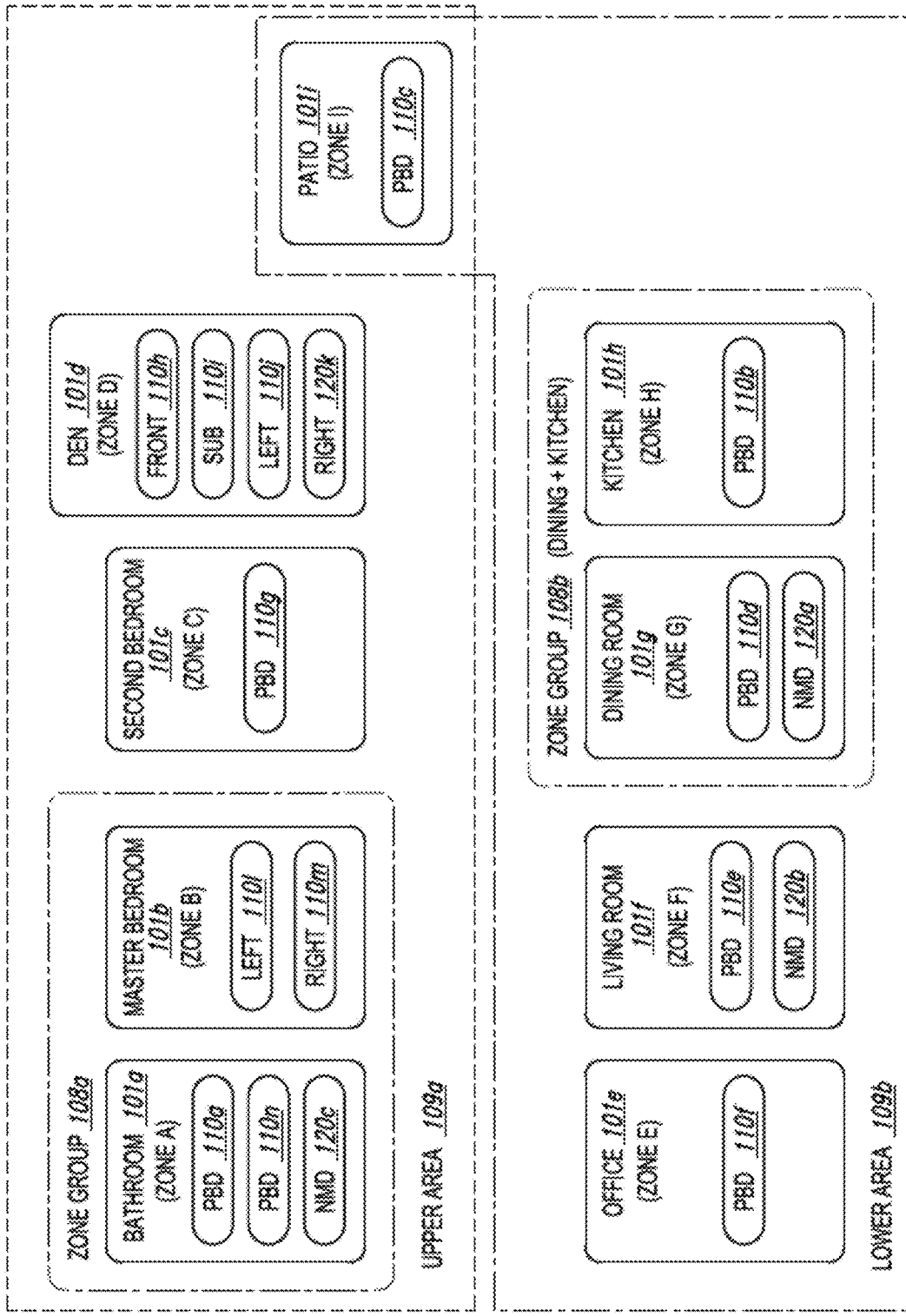
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Left and Right devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. Pat. No. 10,499,146.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017 and titled "Room Association Based on Name," and U.S. Pat. No. 8,483,853 filed Sep. 11, 2007, and titled "Controlling and manipulating groupings in a multi-zone media system." Each of these patents is incorporated herein by reference in its entirety. In some embodiments, the media playback system 100 may not implement Areas, in which case the system may not store variables associated with Areas.

III. Example Systems and Devices

Figure 2A:
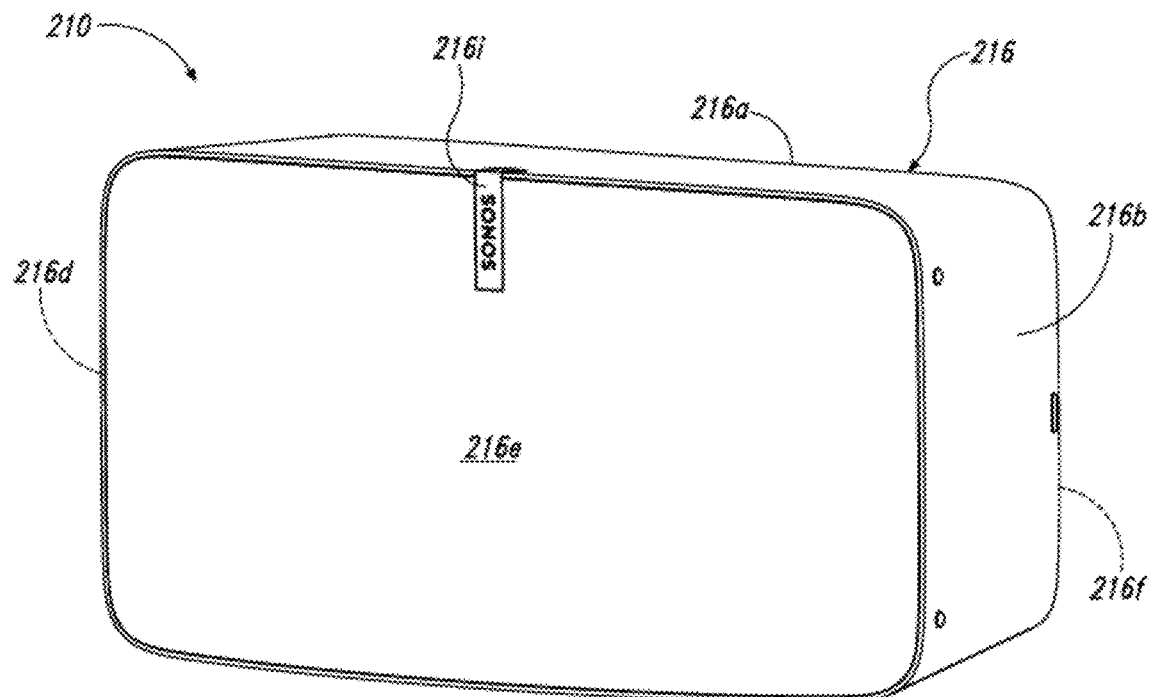
FIG. 2A is a front isometric view of a playback device configured in accordance with aspects of the disclosed technology.
Figure 2B:
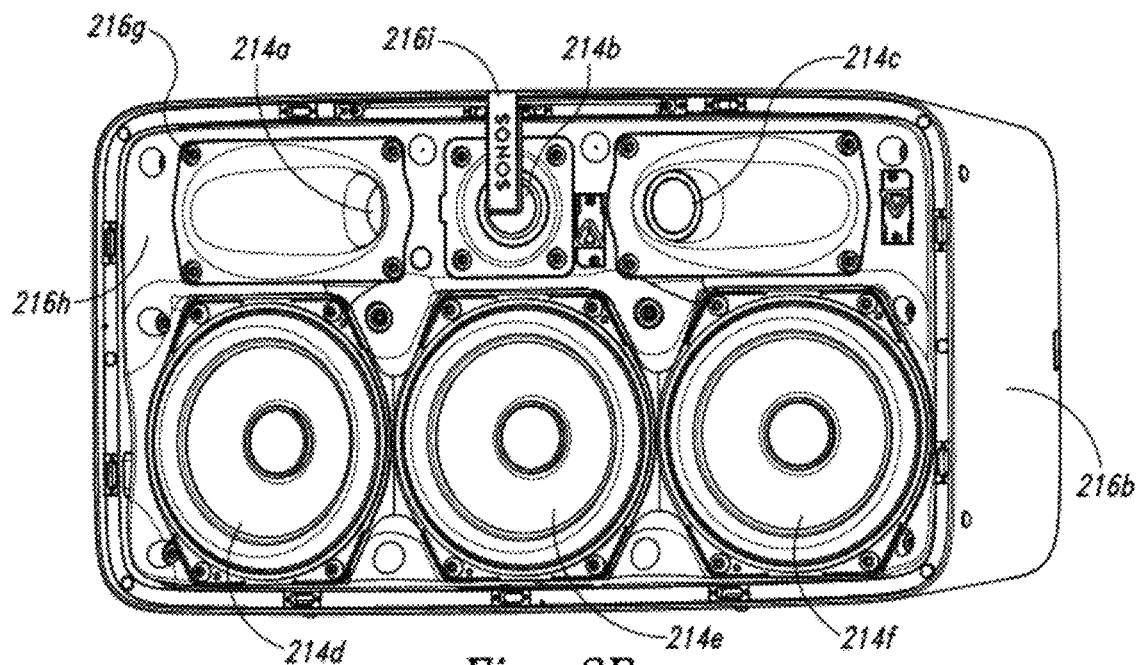
FIG. 2B is a front isometric view of the playback device of FIG. 3A without a grille.
Figure 2C:
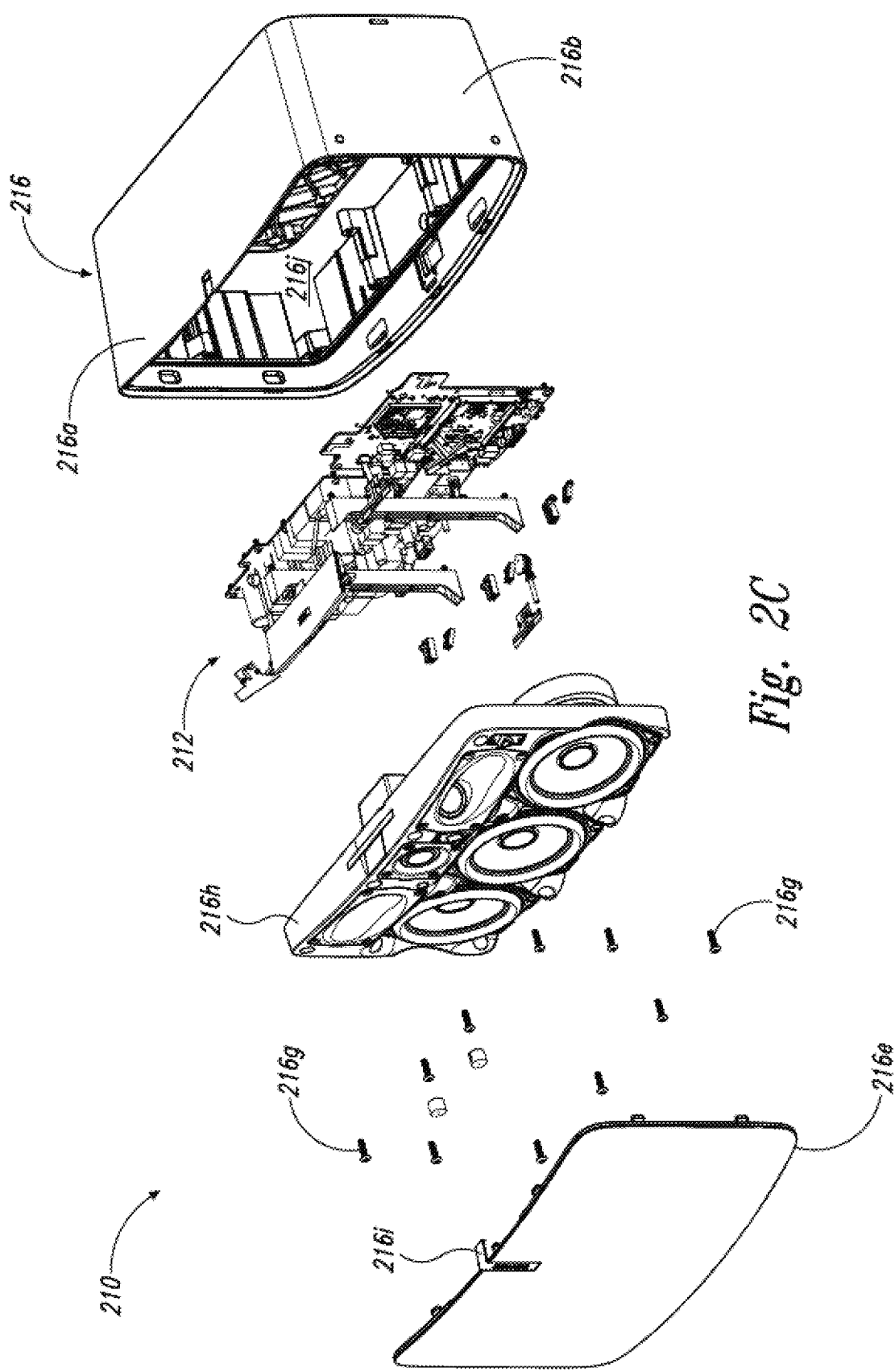
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
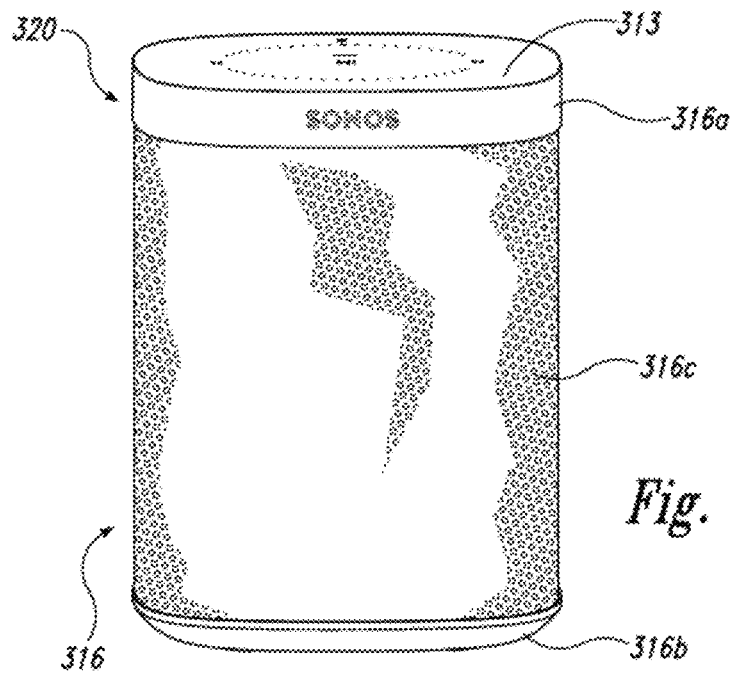
FIG. 3A is a front view of a network microphone device configured in accordance with aspects of the disclosed technology.
Figure 3B:
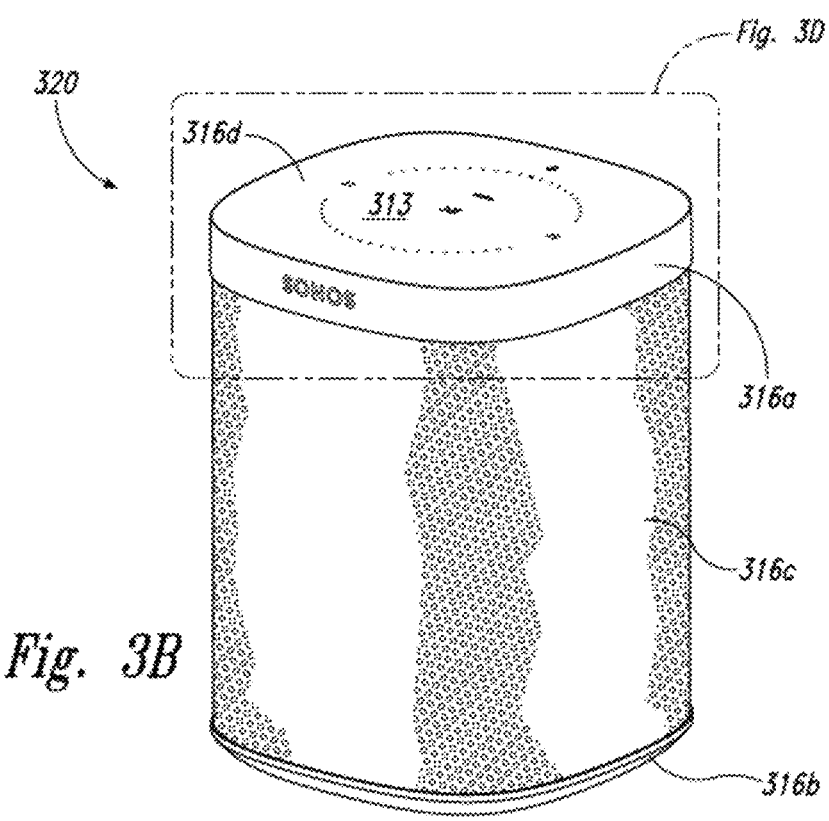
FIG. 3B is a side isometric view of the network microphone device of FIG. 3A.
Figure 3C:
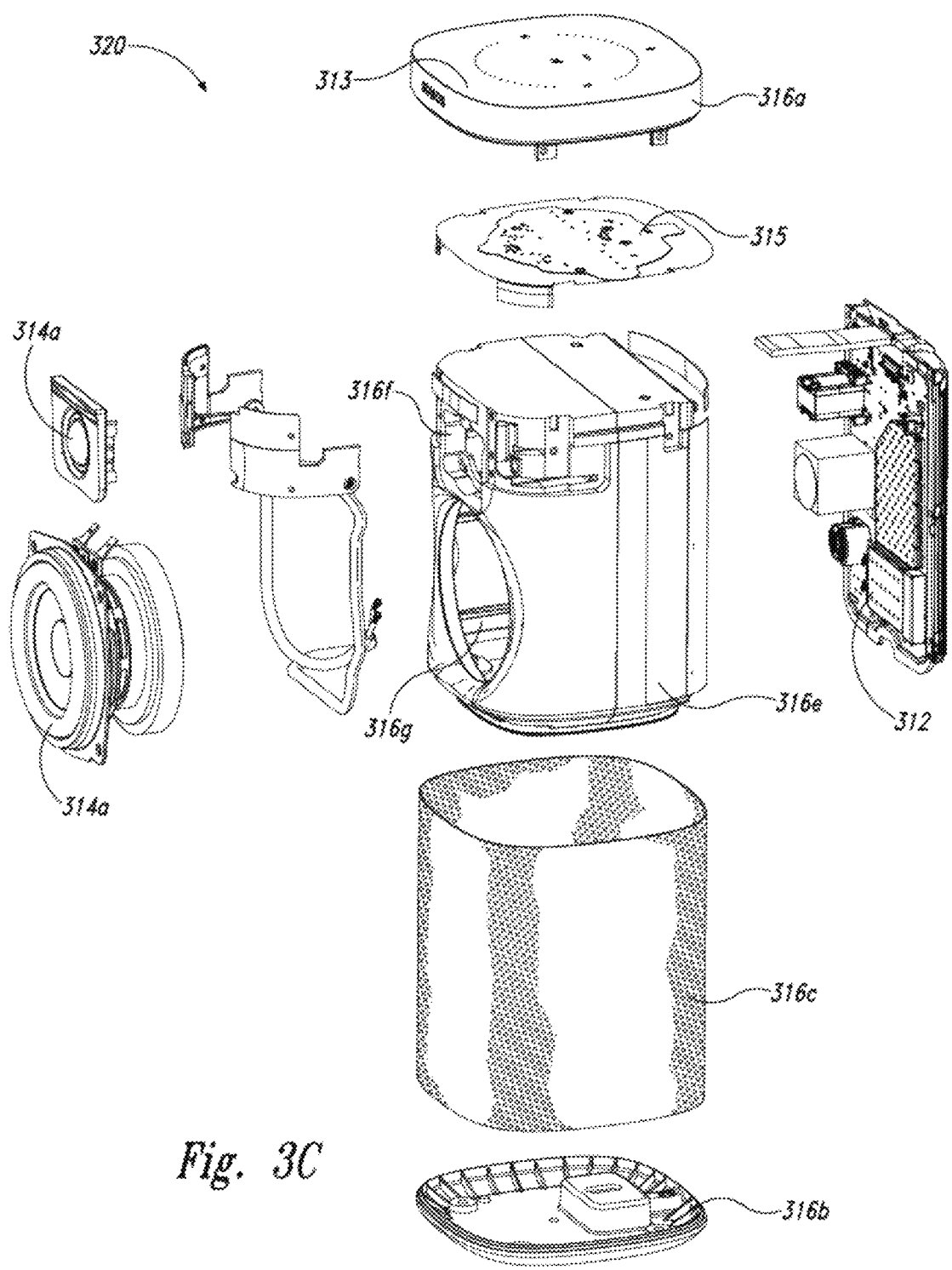
FIG. 3C is an exploded view of the network microphone device of FIGS. 3A and 3B.
Figure 3D:
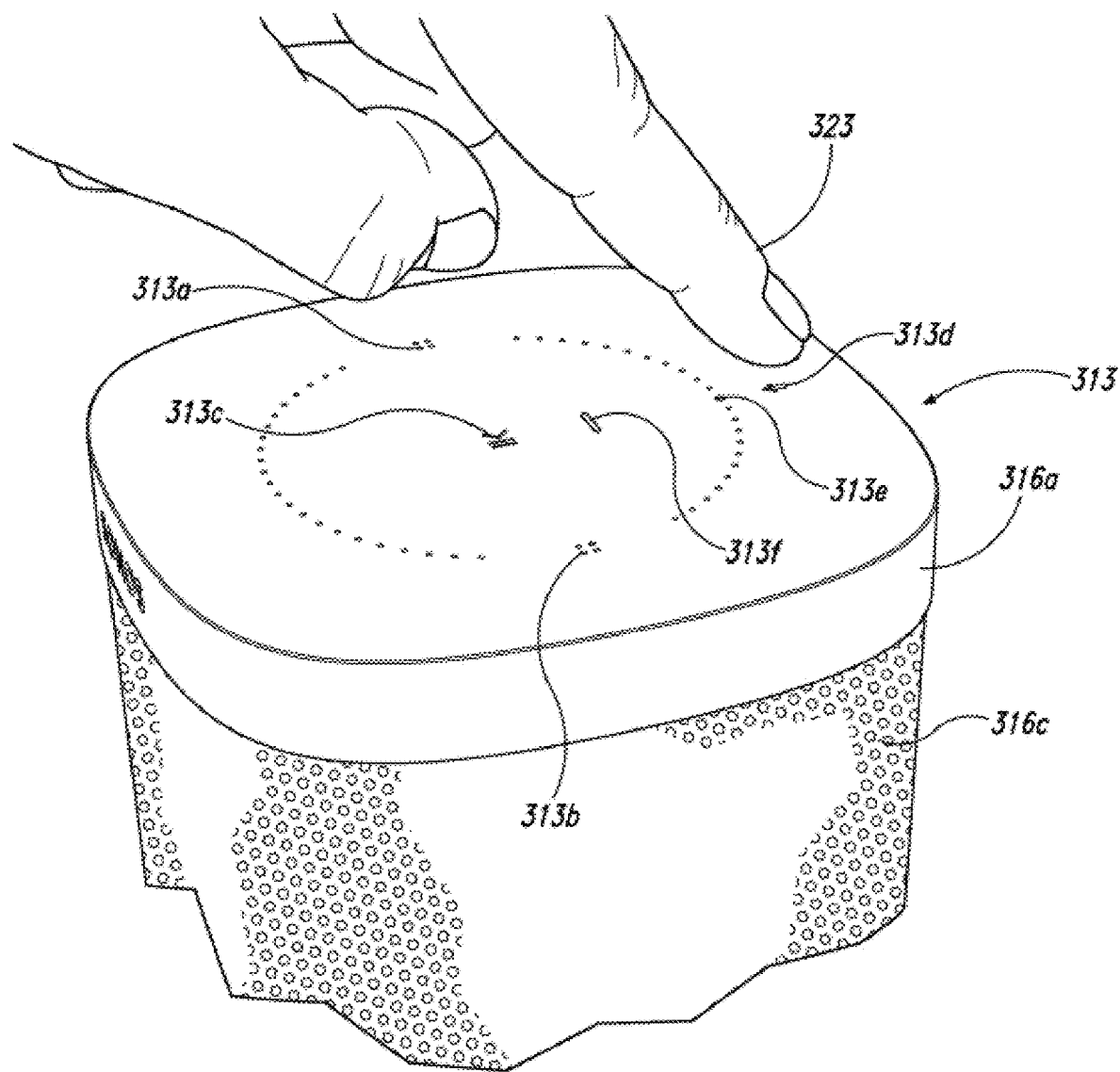
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
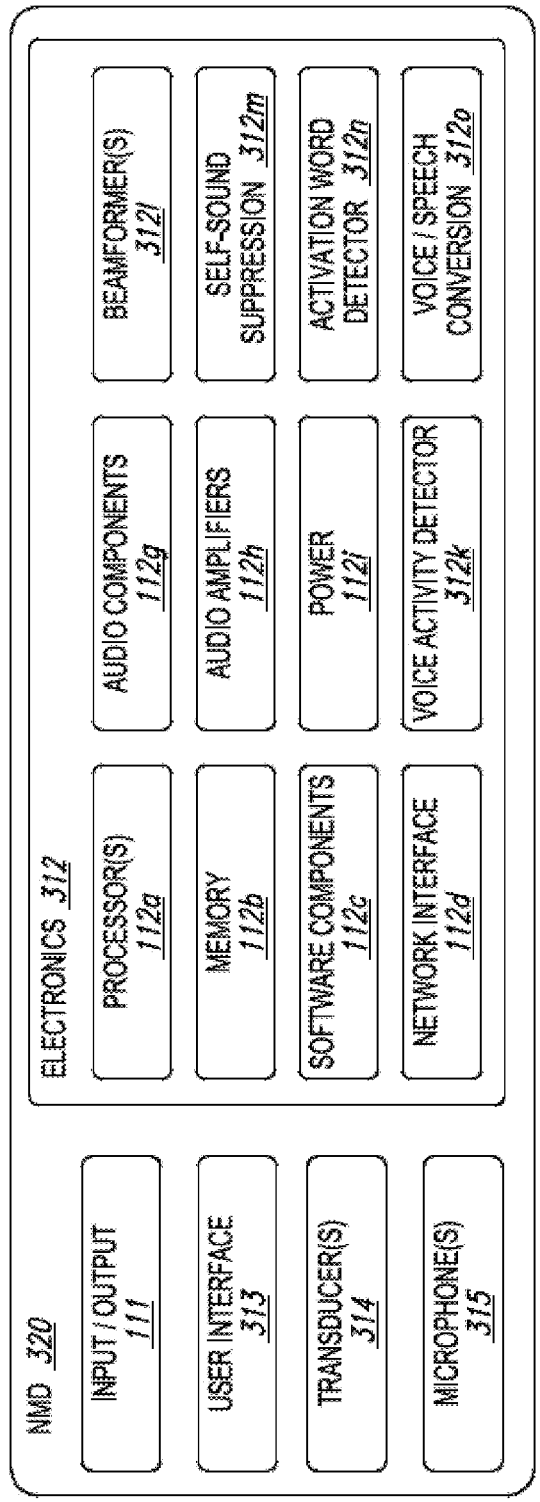
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA, APPLE's SIRI, or MICROSOFT's CORTANA) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
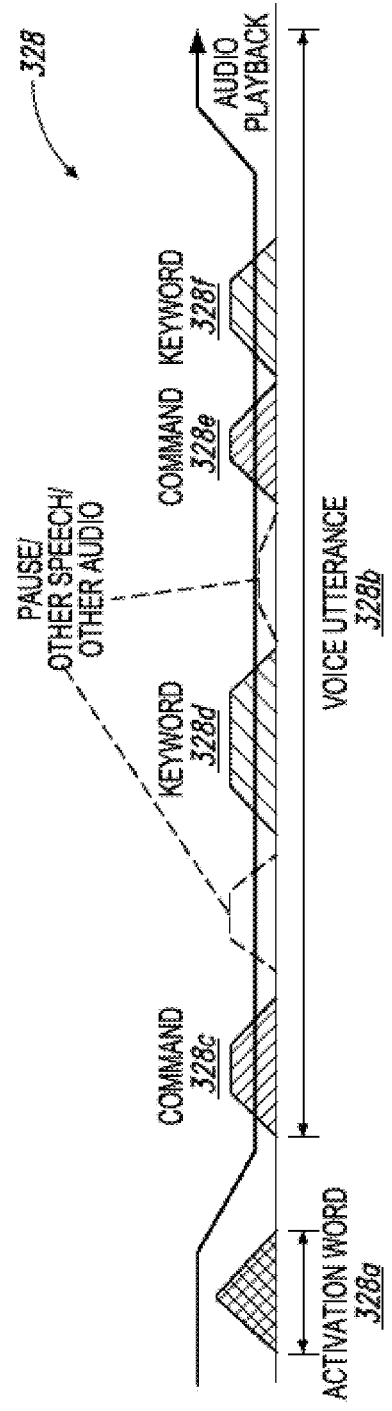
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328O. In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. Pat. No. 10,499, 146, incorporated by reference herein in its entirety.

Figure 4A:
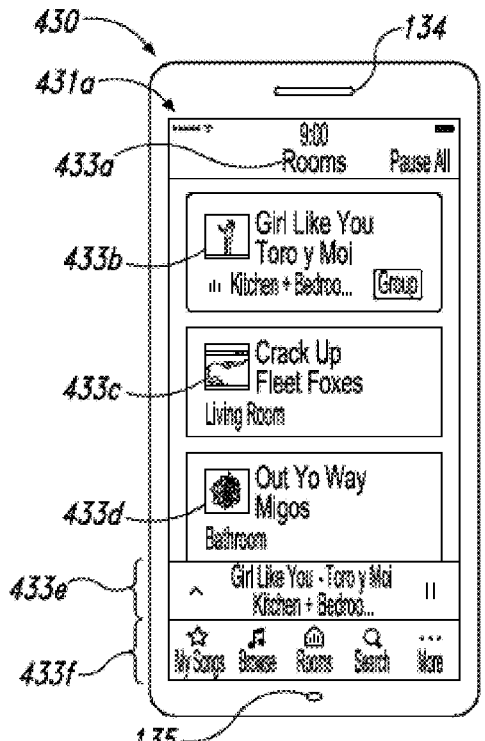
FIGS. 4A-4D are schematic diagrams of a control device in various stages of operation in accordance with aspects of the disclosed technology.
Figure 4B:
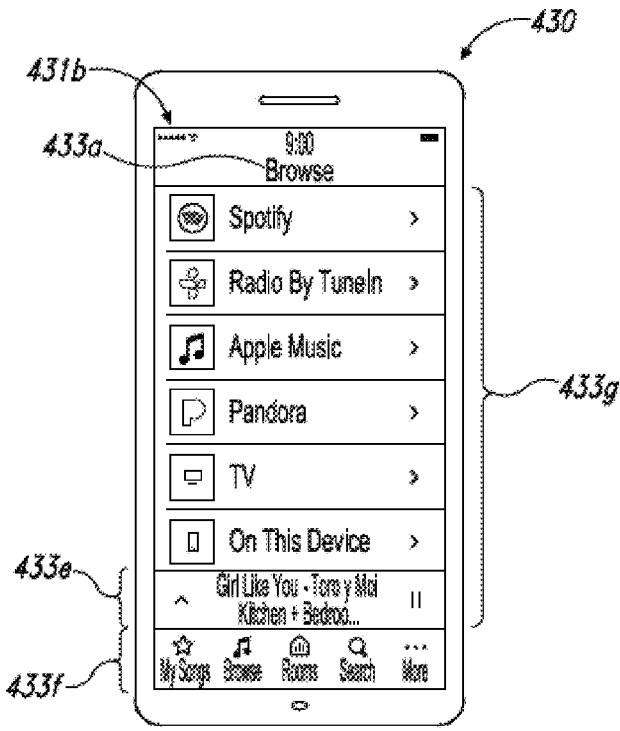
Figure 4C:
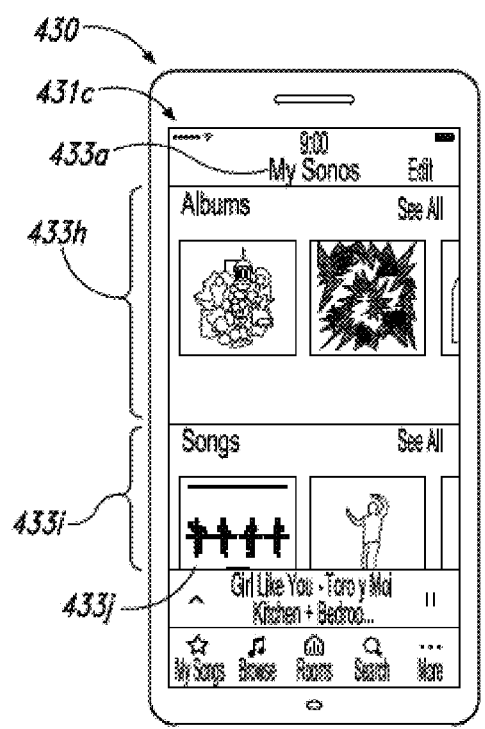
Figure 4D:
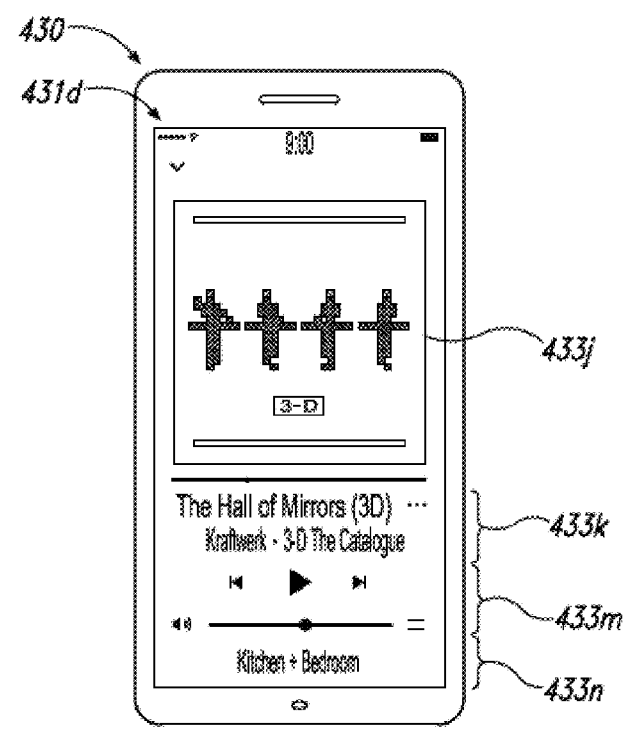

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
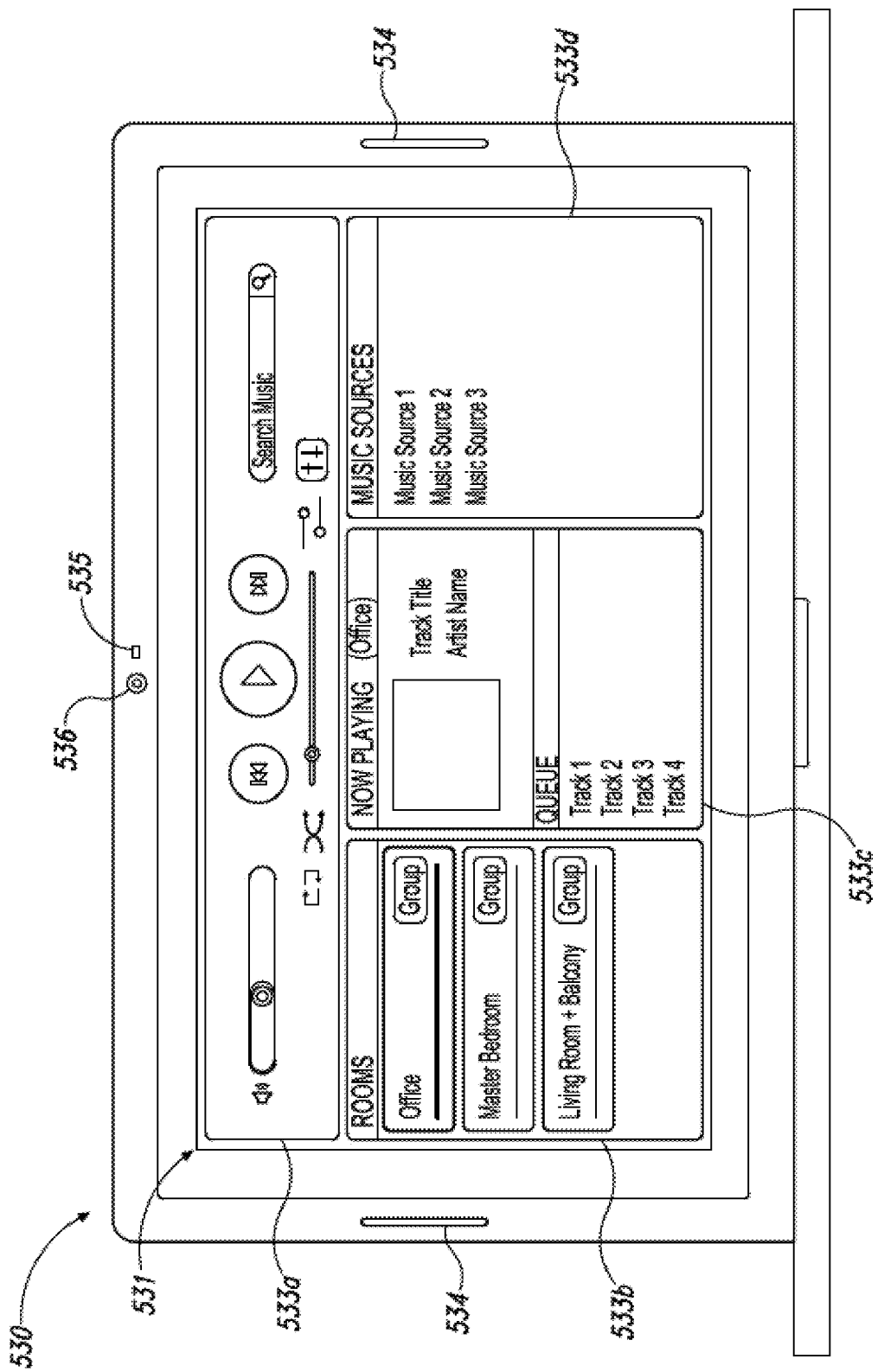
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
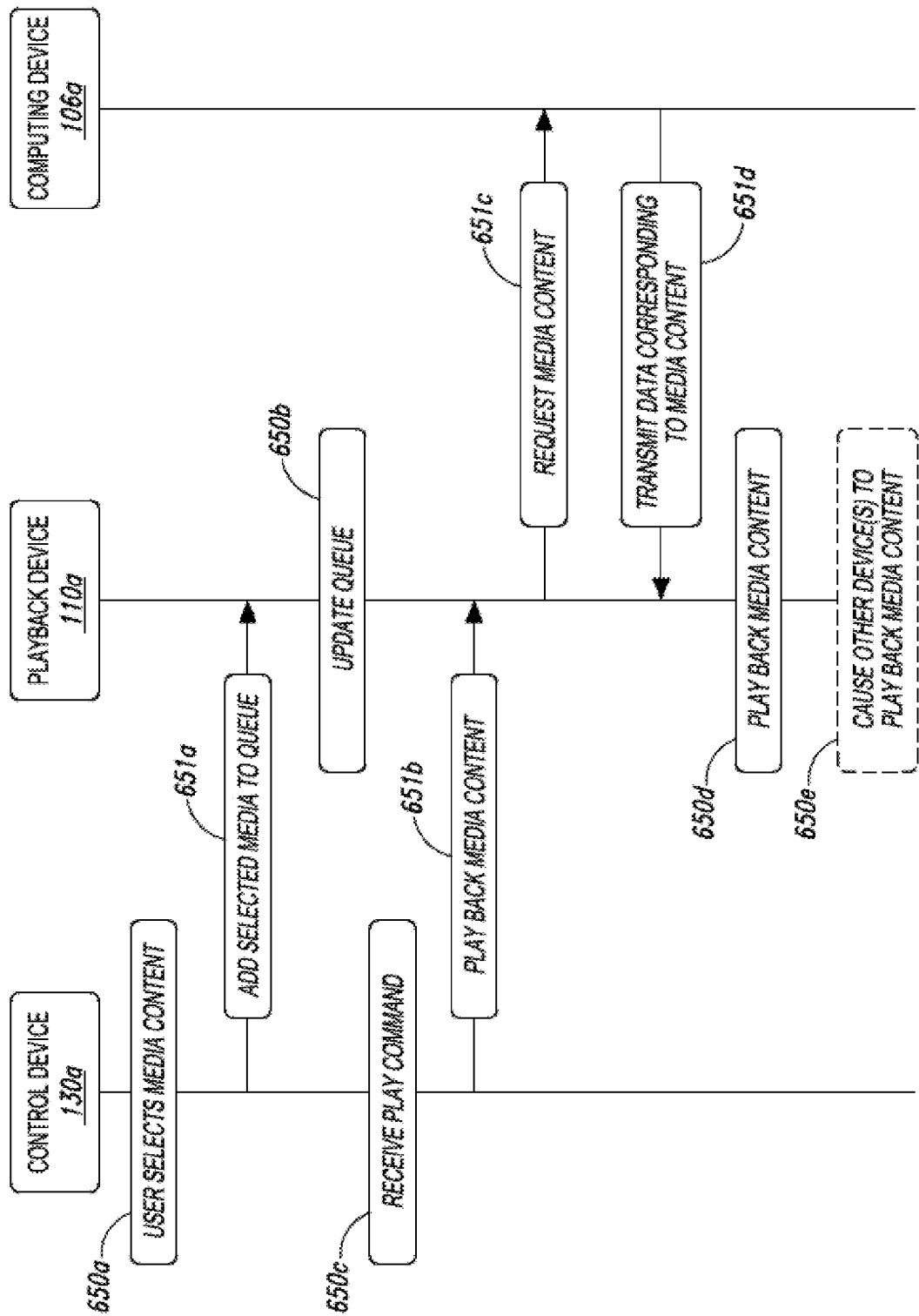
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Example Techniques for Facilitating Re-Bonding of Playback Devices

Figure 7:
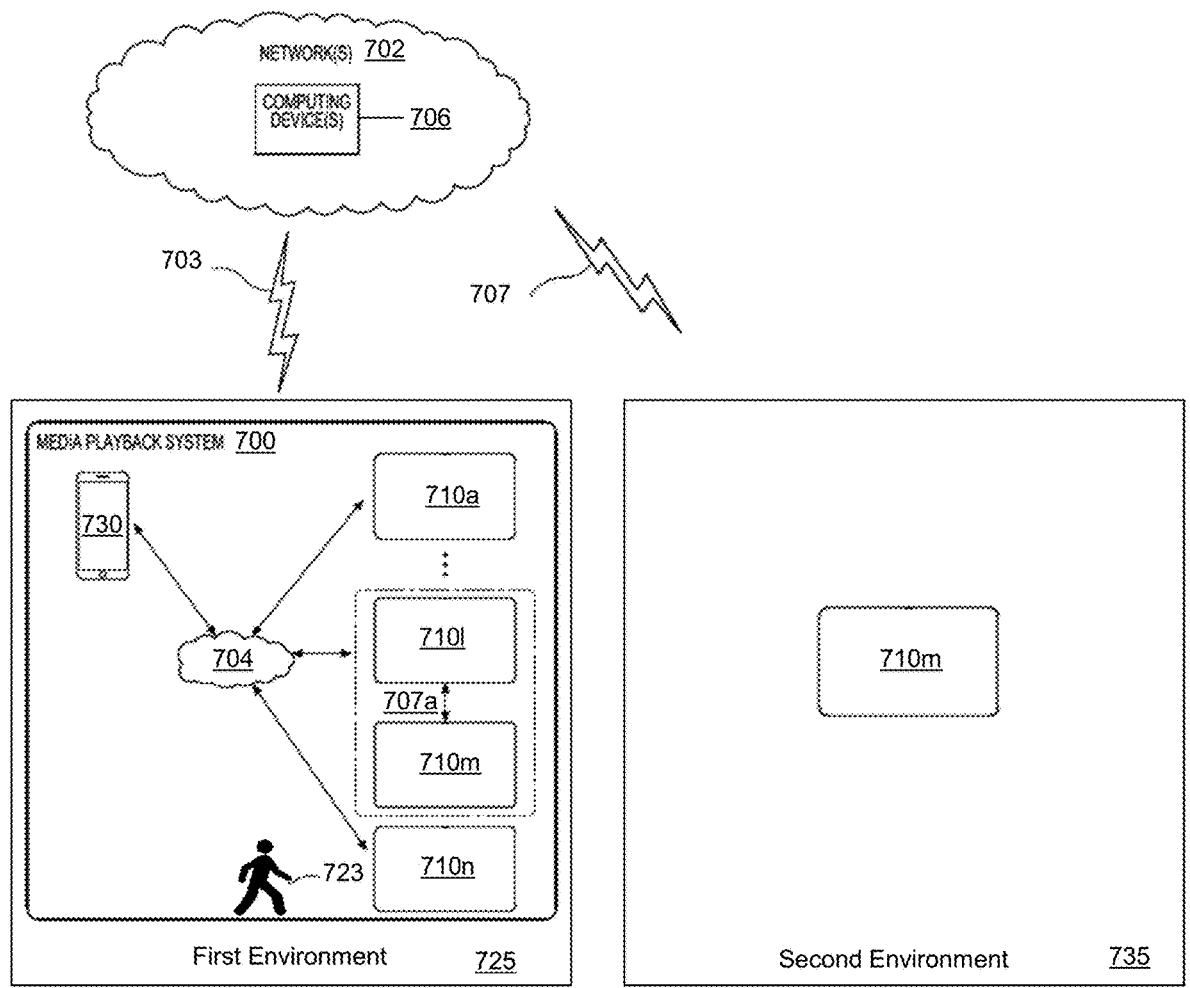
FIG. 7 is a schematic diagram of a media playback system and accompanying playback devices for facilitating re-bonding of playback devices to a bonded zone according to exemplary embodiments.

FIG. 7 shows an example schematic diagram of a media playback system 700 and accompanying playback devices 710a-n, which either alone or in various combinations, may be configured to facilitate re-bonding of playback and/or other devices to a bonded zone according to certain embodiments of the present disclosure. In some embodiments, the media playback system 700 and playback devices 710a-n may be configured to automatically re-bond playback devices 710a-n (and/or other device) to a bonded zone after the playback devices 710a-n have departed the bonded zone and have subsequently become available for communicating with each other. Notably, any of the componentry in FIG. 7 and componentry from FIGS. 1-6 and 8 may be utilized to support the functionality described herein. In some embodiments, the componentry and systems of FIG. 7 may be combined with any of the componentry and systems of FIGS. 1-6 and 8, and the configuration of componentry in FIG. 7 is merely exemplary.

In some embodiments, FIG. 7 may include, but is not limited to including, one or more networks 702, one or more computing devices 706, one or more media playback systems 700, a communication link 703, a communication link 707, a first environment 725, and a second environment 735.

The network 702 may be configured to serve content, receive content, respond to requests for content, request content, and/or perform operations supporting the functionality described herein. For example, the network 702 may serve as a source for delivering content including, but not limited to, audio content, video content, audiovisual content, virtual reality content, augmented reality content, textual content, informational content, and/or data. In some embodiments, the network 702 may include any number of computing devices 706 to facilitate the operation and functionality of the network 702. In some embodiments, the network 702 may include and/or incorporate any of the functionality provided by network 102 and may include any number of networks contained within the network 702. In some embodiments, the network 702 may include, but is not limited to, cloud networks, satellite networks, cellular networks, ethernet networks, personal area networks, local area networks, wireless local area networks, wide area networks, and/or any type of other networks.

In some embodiments, the computing devices 706 of the network 102 may comprise, but are not limited to, servers, computers, routers, switches, routers, gateways, mobile devices, and/or any type of computing device. In some embodiments, the computing device(s) 706 may incorporate any of the functionality of computing devices 106 and may include any number of processors, memories, transceivers, communication modules, graphics cards, microphones, speakers, sensors, and/or other componentry. The computing device(s) 706 can comprise individual computers or servers, such as, for example, a media streaming service server storing audio and/or other media content, a voice service server, a social media server, a media playback system control server, and the like. In some embodiments, one or more of the computing devices 706 may comprise modules of a single computer or server. In certain embodiments, one or more of the computing devices 706 may comprise one or more modules, computers, and/or servers. In some embodiments, the computing devices 706 may be configured to receive requests for content, such as from the playback devices 710a-n, and may be configured to serve the requested content to any one or more of the playback devices 710a-n, such as via communication link 703 connected to media playback system 700.

In certain embodiments, communication links 703 and 707 may be utilized to communicatively couple the network 702 to the media playback system 700 of the first environment 725 and the playback device 710m, which may have been moved from the first environment 725 to a second environment 735. In certain embodiments, the communication links 703 and 707 may comprise, one or more wired networks, one or more wireless networks, one or more WANs, one or more LANs, one or more PANs, one or more telecommunication networks, digital subscriber lines, cable lines, optical fiber lines, wireless communication links, and/or any type of communication links. In some embodiments, the network 702 may be configured to deliver various types of media content to the media playback system 700, such as in response to a request transmitted from the media playback system 700 to the network 702 via the link 703. In some embodiments, the network 702 may also be configured to receive data and/or content from the media playback system 700 and transmit commands and/or media content to the media playback system 700 in response to such data and/or content or independently of such data and/or content.

The media playback system 700 may be a system that may be utilized to facilitate playback of media content, such as, but not limited to, audio content, video, content, augmented reality content, virtual content, haptic content, sensory content, and/or any other type of content. In certain embodiments, the media playback system 700 may be configured to receive media content (or data, instructions, information, etc.) from the networks 702 via the communication link 703. In certain embodiments, the received media content can comprise, for example, a URI, URL, and/or other type of link for accessing content. For example, the media playback system 700 can stream, download, or otherwise obtain media content and/or data from a URI or a URL corresponding to the received media content. In some embodiments, the media playback system 700 may include a network 704 that may communicatively couple the communication link 703 and at least a portion of the devices (e.g., one or more of the playback devices 710a-n, control devices 730, and/or other devices) of the media playback system 700. In some embodiments, the network 704 may include, for example, a wireless network (e.g., a WI-FI network, a BLUETOOTH, a Z-WAVE network, a ZIGBEE, and/or other suitable wireless communication protocol network) and/or a wired network (e.g., a network comprising Ethernet, Universal Serial Bus (USB), and/or another suitable wired communication).

In certain embodiments, the network 704 may include a dedicated communication network that the media playback system 700 may utilize to transmit messages between devices and/or to transmit media content to and from media content sources (e.g., one or more of the computing devices 706 of the network 702). In certain embodiments, the network 704 may be configured to be accessible only to devices in the media playback system 700, thereby reducing interference and competition with other devices. In certain embodiments, however, the network 704 may include an existing household communication network (e.g., a household WI-FI network). In some embodiments, the communication link 703 and the network 704 may comprise one or more of the same networks. For example, the communication link 703 and the network 704 may comprise a telecommunication network (e.g., an LTE network, a 5G network). Additionally, in some embodiments, the media playback system 700 may be implemented without the network 704, and devices comprising the media playback system 700 can communicate with each other, for example, via one or more direct connections, telecommunication networks, and/or other suitable communication links.

In some embodiments, audio content sources may be regularly added or removed from the media playback system 700. In some embodiments, for example, the media playback system 700 may perform an indexing of media items when one or more media content sources are updated, added to, and/or removed from the media playback system 700. The media playback system 700 may scan identifiable media items in some or all folders and/or directories accessible to the playback devices 710a-n, and generate or update a media content database comprising metadata (e.g., title, artist, album, track length) and other associated information (e.g., URIs, URLs) for each identifiable media item found. In some embodiments, for example, the media content database is stored on one or more of the playback devices 710a-n, control devices 130, and/or other componentry of the media playback system 700.

In certain embodiments, the media playback system 700 may include any number of playback devices 710a-n, which may include any of the functionality, componentry, and capabilities of playback devices 110. For example, in certain embodiments, the playback devices 710a-n may include any number of processors, memories, transceivers, communication modules, speakers, microphones, amplifiers, user interfaces, controllers, input devices, any other componentry, or a combination thereof. The playback devices 710a-n may be configured to output any type of content including, but not limited to, audio content, video content, audiovisual content, augmented reality content, virtual reality content, sensory content, or a combination thereof. In certain embodiments, the playback devices 710a-n may also include any number of sensors, which may be utilized to measure sensor data associated with the operation of the playback devices 710a-n, movements of the playback device 710a-n, conditions affecting the playback devices 710a-n, conditions associated with an environment 725, 735 that the playback devices 710a-n are located in, conditions affecting a user (e.g., user 723) of the playback devices 710a-n, and/or other sensor data. In certain embodiments, the sensors may include, but are not limited to, accelerometers, gyroscopes, motion sensors, humidity sensors, pressure sensors, temperature sensors, proximity sensors, infrared sensors, light sensors, GPS or location sensors, acoustic sensors, touch sensors, tilt sensors, any types of sensors, or a combination thereof. Sensor data measured by the sensors may be provided to one or more devices of a media playback system (e.g. media playback system 100) that the playback devices 710a-n are connected to.

In certain embodiments, two or more playback devices 710a-n may form groups. For example, playback devices 710l and 710m comprise a group 707a. In certain embodiments, the grouped playback devices 710l and 710m may be positioned in different rooms in a household and may be grouped together in the group 707a on a temporary or permanent basis based on user input received at the control device 730. When in the group 707a, the playback devices 710l and 710m may be configured to play back the same or similar audio content in synchrony from one or more audio content sources. In certain embodiments, for example, the group 707a comprises a bonded zone (e.g., stereo pair, home theater, etc.) in which the playback devices 710l and 710m comprise left audio and right audio channels, respectively, of multi-channel audio content, thereby producing or enhancing a stereo effect of the audio content. As another example, the bonded zone may comprise arranging the layback devices 710l and 710m as a home theater setup where each of the playback devices serves as satellites and/or surround sound for the media playback system 700. In some embodiments, the group 707a may include additional playback devices 710.

The media playback system 700 may also include a control device 730, which may include and/or incorporate any of the componentry, features, and/or functionality of the control device 130. In certain embodiments, the control device 730 may be a mobile device (e.g., a smartphone, smartwatch, smart device, etc.), a computer, a remote controller, any other device, or a combination thereof. The control device 730 may include or be configured to access a software application, which may be configured to control any of the playback devices 710a-n, such as via signals transmitted using network 704. In certain embodiments, the control device 730 may be controlled by the user 723, who may utilize the control device 730 to play media content, group playback devices 710a-n, and/or perform any other operations with respect to the media playback system 700.

In certain embodiments, the media playback system 700 may be located in a first environment 725, which may be any type of location that the media playback system 700 and/or componentry of the media playback system 700 may reside. For example, the environment 725 may be a home, a room within a home, a train station, an airport, a commercial building, a field, a vessel, a vehicle, a concert venue, any type of environment, or a combination thereof. In some embodiments, one or more components of the media playback system 700 may be moved to another environment, such as second environment 735. For example, as illustratively shown in FIG. 7, playback device 710*m* may be moved by the user 723 from the first environment 725 to the second environment 735, which, for example, may be a beach or other location. In certain embodiments, the moved device 710*m* may be configured to communicatively link to the network 702, such as via communication link 707. In certain embodiments, the user 723 may move the playback device 710*m* from the second environment 735 back to the first environment 725. For example, the user 723 may have taken the playback device 710*m* to a beach and, when the user 723 is done with the beach, the user 723 may return to the user's 723 home (e.g. first environment 725).

Operatively, the functionality and features provided by the present disclosure may be utilized to enhance the ways in which playback and/or other devices of a media playback system (e.g., media playback system 700) bond and/or un-bond with each other while factoring in the context of how and/or why previous bonds between and/or among the playback devices occurred. In some embodiments, playback devices (e.g. playback devices 710*a-n*) may be configured to play together in multiple distinct ways. For example, the playback devices may play together as a bonded set (e.g., such as via a bonded zone comprising a stereo pair setup, home theater setup, or other setup) and/or as a group. Portable playback devices that are bonded (e.g., as a stereo pair) may move around significantly more than stationary playback devices. As a result, a portable playback device of the stereo pair may not be close enough to their stereo pair partner playback device to provide a quality stereo listening experience to a user, such as user 723. To accommodate this issue, the functionality provided by the present disclosure updates existing bonding experiences to provide improved flexibility for a bonded set of playback devices. In some embodiments, this may have benefits to stationary players that may be disconnected or have errors. In certain embodiments, the present disclosure may facilitate stereo-on-demand to let a user play media content in stereo (or other setup) whenever the user's desires without creating a more permanent bond. To that end, the present disclosure may provide a stereo mode when a user has two (or potentially more) playback devices grouped together.

The present disclosure, for example, may provide for grouped playback devices and bonded playback devices. With regard to grouped playback devices which may include ad hoc and saved groups (e.g., saved via an application, such as an application executing on the control device 730), a user may form or set up playback devices into a group by utilizing the controller or creating a saved group of playback devices. For example, the user 723 may group two devices located in a living room of a home as the living room group by utilizing the controller. The names of each of the devices in the group may be displayed via a user interface of the controller as two unique entities. Each of the devices in the group may have different settings commensurate with each device's capabilities and the playback devices may be separately controlled and/or targeted by third parties. In terms of starting stereo playback for the grouped playback devices, a user 723 may change the audio to play in "stereo mode" by utilizing the controller. When such a change is made, for example, one of the playback devices in the group may output the left audio channels of audio content and the other may output the right audio channels of the same audio content to provide a stereo effect. In certain embodiments, the right and left channels may be designated (e.g., by the user and/or the controller) when the "stereo mode" is activated. In certain embodiments, the user may change the audio to play in "stereo mode" outside of the controller. For example, the user may change to "stereo mode" by conducting a hardware interaction (e.g. a button press of a button of the playback device, pressing the button in a specific sequence or number of times, etc.), inputting a voice command, and the like. With regard to breaking stereo playback for the grouped playback devices, the "stereo mode" may be broken when the session ends (e.g. audio content is done playing or the user is done using the playback devices), if a playback device is removed from the group, and/or if the user actively turns off the "stereo mode", such as by interacting with the controller.

With regard to bonded playback devices, which may include bonded pairs of playback devices and/or sets of playback devices, a user may form or set up the playback devices to be in a bonded zone (or bonded set) by utilizing a wizard flow during setup or from settings in the controller. The playback devices that are bonded together as a pair/set may be displayed as a single entity or "room" in the controller to further show the bond. In certain embodiments, the controller may be configured to display that there are two devices in the singular entity (e.g. Kitchen (2)) or may add an icon or other indicator indicating that the entity includes two devices. For bonded playback devices, each of the devices may share the same settings and may be the same target for third parties. In certain embodiments, the bonded playback devices may always play in stereo. In certain embodiments, playback may automatically default to stereo mode when both playback devices are present and have been previously bonded (and potentially close together in proximity). With regard to breaking the bond between bonded playback devices, stereo playback may be intentionally broken (i.e. removed) by the user removing the bond via settings in the controller. In certain embodiments, if one of the playback devices in the bonded pair goes offline, the controller (e.g., control device 730) may display that only one playback device is in use and may play in mono. In certain embodiments, when it comes to re-bonding the playback devices together, when a missing playback device that was previously bonded reappears (such as via the interface of the controller), the bond may be formed again without user intervention. In certain embodiments, the user 723 may identify which player will play the right channel audio and which player will play the left channel audio, such as via the controller.

In some embodiments, playback devices and/or media playback systems described herein may maintain playback devices in a bonded zone, separate the playback devices from the bonded zone, prevent re-joining of separate playback devices to the bonded zone, and/or automatically re-join separate playback devices depending on contextual information. For example, playback devices may be maintained in the bonded zone if one or both of the playback devices activate and/or utilize a voice assistant to receive commands and perform various operations based on such commands. In certain embodiments, in the event playback devices leave the bonded zone, the causes for leaving the bonded zone may be recorded by the playback devices and/or media playback systems associated with the playback devices. For example, in certain embodiments, if the cause of playback devices leaving a bonded zone was because one or more of the playback devices in the bonded zone established a BLUETOOTH connection with another device, the bond may not be reformed when the separate playback devices are able to communicate with each other on a subsequent occasion. As another example, if one of the playback devices belonging to a bonded zone with another playback device (e.g., as a stereo pair) disappears (e.g. such on a user interface of an application) without any user intervention (e.g. a software update occurs), the playback devices may be automatically re-joined to the bonded zone when the playback device that disappeared is back online. As yet another example, if one device in a bonded stereo pair disappears with user intervention (e.g., the user manually powered down a playback device or the playback device left a network supporting communication capability for the bonded stereo pair), the playback devices may not be automatically re-joined when the playback device is back online (e.g., reappears).

In certain embodiments, settings may be established to automatically re-join/re-bond playback devices into a stereo pair (or home theater setup and/or other setup) in all cases or in a subset of cases. Such settings may be established via an application, such as via an application of the controller. In certain embodiments, BLUETOOTH line-in may be configured to playback in stereo if a local area network connection exists. In certain embodiments, re-bonding or initial bonding of playback devices may be performed not only via software, but also via hardware interactions between and/or among the playback devices. For example, re-bonding or initial bonding of playback devices may be accomplished by shaking the playback devices in a certain manner, contacting them together, depressing buttons (e.g., such as in a certain sequence and/or duration), and/or conducting any other hardware-related actions. In certain embodiments, user interfaces of the playback devices and/or control devices may be modified to provide settings to set conditions under which bonds may be automatically reformed or not. In certain embodiments, when a stationary playback device of a bonded stereo pair (or other bonded pair) is not available, the bond between the playback devices may be broken and the remaining playback device that is available may playback content in mono. When a stationary playback device that was previously in a bonded stereo pair becomes available, the bond between the playback devices may be reformed, thereby re-establishing the stereo pair.

In certain embodiments, various factors may be utilized to determine whether to re-bond playback devices. Such factors may include, but are not limited to, how many bonds have already been rebounded, whether a bond is to be re-bonded manually or automatically, how long a bond between or among playback devices was separated/broken, the types of playback devices, the capabilities of the playback devices, and/or other factors. The factors utilized to re-bond or maintain separation of playback devices may be adjusted, such as via the controller or even via hardware interactions with the playback devices.

Notably, the playback devices 710a-n, control device 730, media playback systems 700, and/or other componentry may be configured to support additional use-case scenarios. The use-case scenarios may be utilized to describe exemplary situations which warrant automatic re-bonding of playback devices to a bonded zone or maintaining the separation of the playback devices based on certain conditions and/or contextual information. In some embodiments, the current default stereo bonding may involve setting the left side playback device in an environment 725 as the primary device in the bonded zone and the right-side playback device as the secondary device in the bonded zone. In some embodiments, if there is a feature delta between playback devices (and/or other devices), a group coordinator device (e.g., a playback device) may be the device with the richer feature set in comparison to the other playback devices in the bonded zone. Additionally, in some embodiments, whichever playback device that a user (e.g., user 723) selects from application settings to create the bonded stereo pair may be designed as the primary device when the playback devices in the bonded stereo pair have the same feature set. As a result, this may result in different system behaviors depending on which playback device is removed from WI-FI or another type of network supporting the bond. The following use-case scenarios provide exemplary situations that serve to improve the breaking apart of stereo bonds (and/or other types of bonds, such as home theater, etc.) and facilitate the mending of such bonds when possible. Additionally, the following use-case scenarios illustrate that playback devices can be broken apart from their bonds and still function, regardless of what playback devices is removed from the bonded zone (or other topology), and then return those playback devices to their bonded state if and when the topology again allows.

In an example use-case scenario, the use-case scenario may involve a user (e.g., user 723) creating a stereo pair (thereby creating a bond) on the user's home WI-FI network, such as by utilizing an application of the controller 730 and/or playback devices. In some embodiments, if it is the first time that the user is creating the stereo pair bond and the playback devices are positioned on charging bases, the bond may be set up through the controller and a bond tone may be output signifying creation of the bond. In some embodiments, if it is the first time that the user is creating the stereo pair bond and the playback devices are not on charging bases (e.g., using battery power), the bond may be set up through the controller and a bond tone may be output signifying creation of the bond. In some embodiments, if it is the first time that the user is creating the stereo pair bond and the primary playback device is playing audio content, the bond may be set up through the controller and a bond tone may be suppressed.

In some embodiments, if it is the nth time that the user is creating the stereo pair bond and the playback devices are positioned on charging bases, the bond may be set up through the controller and a bond tone may be output signifying creation of the bond. In some embodiments, if it is the nth time that the user is creating the stereo pair bond and the playback devices are not on charging bases (e.g., using battery power), the bond may be set up through the controller and a bond tone may be output signifying creation/formation of the bond. If it is the nth time that the user is creating the bond and the user has three devices in the user's household (e.g. environment 725), two of the playback devices may be stereo-paired. The bond between the stereo-paired devices may be broken if the speakers are to be used separately. The user may attempt to re-bond the playback devices, but may not have the correct two playback devices for bonding purposes. In such embodiments, there may be no memory of previous bonds so the bonds may be set up again via the controller by the user and a bonding tone may be played signifying bond formation. In some embodiments, if it is the nth time that the user is creating the stereo pair bond and the primary is playing back audio content, the bond may be setup between the playback devices and the bonding tone may be suppressed.

It should be appreciated that the equalization settings of one or more of the playback devices may be modified upon joining, leaving, and/or re-joining a bonded zone (e.g., to avoid playback with one or more equalization settings that are a poor match for the present operation conditions). These equalization settings may be updated in any of a variety of ways including: (1) returning to one or more previous settings and/or one or more default settings; (2) triggering execution of a self-tuning process (e.g., SONOS auto Trueplay) that generates one or more equalization settings (e.g., by measuring and/or estimating an acoustic response of an environment using acoustic signals); and/or (3) prompting a user to perform a tuning process (e.g., SONOS Trueplay) that generates one or more equalization settings. For example, a set of playback devices may be bonded or un-bonded using the controller and the controller may trigger one or more of the playback devices in the set to update one or more equalization settings.

In some embodiments, if audio content is being played back from the bonded stereo pair on the user's home WI-FI network and the primary playback device (e.g. the playback device serve as the left channel) or secondary playback device (e.g. right channel) lifts off the charging base, the audio content may continue playing in stereo. In some embodiments, if audio content is being played back from the bonded stereo pair on the user's home WI-FI network and the primary playback device (or secondary playback device) moves several rooms away from the secondary playback device (or first playback device), the audio content may continue playing in stereo. If, however, if audio content is being played back and the primary playback device moves outside of WI-FI range, the audio content may stop on the primary payback device (e.g., dropout). After a desired buffer of time (e.g. 15 seconds), the audio content may be stopped on the secondary playback device as well. Once the heartbeat is lost between the primary and secondary playback devices, a countdown timer may be configured to start. After "x" period of time, the stereo bond between the primary and secondary playback devices may be broken and both playback devices may return to their default names in the controller. If the primary and secondary playback devices regain communication with each other before the countdown timer expires, the stereo bond may automatically be re-established. In some embodiments, if audio content is being played back and the primary playback device moves outside of WI-FI range, the audio content may stop playing on the primary playback device and, after a designated period of time, audio content may be stopped on the secondary playback device. When the heartbeat is lost between the playback devices, a countdown timer may initiate. After a designated period of time, the stereo bond may be broken and both playback devices may return to their default names in the controller (e.g., instead of being named as a stereo pair). To recreate the stereo bond, the user may need to go through the stereo bonding setup process on the controller. If, however, the playback devices regain communication with each other prior to the expiration of the countdown timer, the playback devices may maintain their stereo bond (e.g., remain in the bonded zone with each other).

In some embodiments, if audio content is being played back and the primary playback device moves outside of WI-FI range, the audio content may stop playing on the primary playback device and, after a designated period of time, audio content may be stopped on the secondary playback device. A Sig Detail LED may flash orange if pressed, and, even if rebooted, the secondary playback device may remain unusable. In certain embodiments, some voice assistant commands continue to work (e.g., time/weather/skills), but not audio content playback (though the voice assistant may not notice any problem). The controller may show music continuing playback, but an application control may return an error message "Unable to connect to Sonos player." In certain embodiments, after a period of time, the secondary playback device may remain in the same state as described above, however, the controller may now remove the stereo pair from the Rooms Menu (e.g., it disappears) of the controller. If the primary playback device returns to the WI-FI network, the stereo pair may resume previous settings, but audio content may need to be manually restarted. If the primary playback device does not return, a way to make the secondary playback device usable is go to Room Settings, where the pair may appear as "Room name (?+R)," and it can be separated. However, if the secondary playback device has a different name than the original bond, the voice assistant may need to "Discover Devices" in order for voice control to operate.

In some embodiments, if audio content is being played back by a stereo pair and the primary playback device switches to BLUETOOTH pairing mode (e.g., such as via a button push), audio content playback may stop on the primary playback device and after a period of time buffer, audio content may stop on the secondary playback device. After the heartbeat is lost between the playback devices and a threshold period of time elapses, the bond may be broken and both playback devices may return to their default naming and roles. If the playback devices regain communication prior to the expiration of the threshold period of time, the playback devices may maintain their stereo bond. In some embodiments, if audio content is being played back by a stereo pair and the primary playback device switches to BLUETOOTH pairing mode (e.g., such as via a button push), putting a playback device into BLUETOOTH discovery/pairing mode (e.g. 2 second power button press till the blue flash appears on the playback device) does not stop audio content that is already playing on either playback device in the stereo pair and it does not break the bond. In further embodiments, if audio content is being played back by a stereo pair and the primary playback device switches to BLUETOOTH pairing mode (e.g., such as via a button push), the audio content may simply continue playing in stereo for the stereo pair.

In some embodiments, if audio content is being played back by a stereo pair and the primary playback device establishes a BLUETOOTH connection with another device (or other type of connection), the bond may break. If there is WI-FI audio playback, the audio content stream may be delighted to the separated playback device that is still connected to the WI-FI. In certain embodiments, if audio content is being played back by a stereo pair and the primary playback device establishes a BLUETOOTH connection with another device (or other type of connection), the BLUETOOTH Classic connected playback device may display a blue LED and audio content may continue playing in stereo. In some embodiments, if audio content is being played back by a stereo pair on a home WI-FI network (or other network) and an airplay connection is established with the primary, the stereo bond may not separate and the primary playback device may be the Airplay target for the connection and there may be no delegation of the audio content. In some embodiments, if audio content is being played back by a stereo pair on a home WI-FI network (or other network) and a direct control connection is established with the primary, the stereo bond will not break and the primary playback devices may be the direct control target and there may be no delegation of the audio content playback.

In some embodiments, if audio content is being played back by a stereo pair on a home WI-FI network (or other network) and the primary playback device powers off (e.g., via a button push), audio content may cease on the primary playback device and audio content may continue on the secondary playback device. The stereo bond may be broken and both playback devices may return to their initial confirmed name. The user may then need to manually recreate the stereo bond using the controller. In some embodiments, if audio content is being played back by a stereo pair on a home WI-FI network (or other network) and the primary playback device runs out of battery (enters a sleep mode), the audio content may stop playing on the primary playback device and, after a designated period of time, audio content may be stopped on the secondary playback device. A Sig Detail LED may flash orange if pressed, and, even if rebooted, the secondary playback device may remain unusable. In certain embodiments, some voice assistant commands continue to work (e.g., time/weather/skills), but not audio content playback (though the voice assistant may not notice any problem). The controller may show music continuing playback, but an application control may return an error message "Unable to connect to Sonos player." In certain embodiments, after a period of time, the secondary playback device may remain in the same state as described above, however, the controller may now remove the stereo pair from the Rooms Menu (e.g., it disappears) of the controller. If the primary playback device returns to the WI-FI network, the stereo pair may resume previous settings, but audio content may need to be manually restarted. If the primary playback device does not return, a way to make the secondary playback device usable is go to Room Settings, where the pair may appear as "Room name (?+R)," and it can be separated. However, if the secondary playback device has a different name than the original bond, the voice assistant may need to "Discover Devices" in order for voice control to operate. In some embodiments, if audio content is being played back by a stereo pair on a home WI-FI network (or other network) and the primary playback device runs out of battery (enters a sleep mode), the audio content may stop in the primary playback device and the audio content may continue on the secondary playback device. The stereo bond may be broken and both playback devices may return to their confirmed name. In further embodiments, if audio content is being played back by a stereo pair on a home WI-FI network (or other network) and the primary playback device runs out of battery (enters a sleep mode), the audio content may be stopped on the primary playback device and the audio content may continue on the secondary playback device. The stereo bond may be broken and both playback devices may return to their initial confirmed names. When the primary playback device returns to the network, the stereo bond may be automatically re-established.

In some embodiments, if audio content is being played back by a stereo pair on a home WI-FI network (or other network) and the primary playback device experiences a software update (and a reboot occurs), an unexpected restart, manual sleep, and/or goes to sleep after a period of idle time, the audio content may stop playing on the primary playback device and, after a designated period of time, audio content may be stopped on the secondary playback device. A Sig Detail LED may flash orange if pressed, and, even if rebooted, the secondary playback device may remain unusable. In certain embodiments, some voice assistant commands continue to work (e.g., time/weather/skills), but not audio content playback (though the voice assistant may not notice any problem). The controller may show music continuing playback, but an application control may return an error message "Unable to connect to Sonos player." In certain embodiments, after a period of time, the secondary playback device may remain in the same state as described above, however, the controller may now remove the stereo pair from the Rooms Menu (e.g., it disappears) of the controller. If the primary playback device returns to the WI-FI network, the stereo pair may resume previous settings, but audio content may need to be manually restarted. If the primary playback device does not return, a way to make the secondary playback device usable is go to Room Settings, where the pair may appear as "Room name (?+R)," and it can be separated. However, if the secondary playback device has a different name than the original bond, the voice assistant may need to "Discover Devices" in order for voice control to operate. In some embodiments, if audio content is being played back by a stereo pair on a home WI-FI network (or other network) and the primary playback device experiences a software update (and a reboot occurs), an unexpected restart, manual sleep, and/or goes to sleep after a period of idle time, the audio content may be stopped on the primary playback device and the audio content may continue on the secondary playback device. The bond may be broken and both playback devices may return to initial names. When the primary playback device returns to the network, the stereo bond may be reestablished.

In some embodiments, if audio content is being played back by a stereo pair on a home WI-FI network (or other network) and the primary playback device goes to sleep after the secondary playback device and if both playback devices do not get woken after a period of time, a topology timeout and separation of the bond may occur. In some embodiments, audio content may stop on the primary playback device, audio content may continue on the secondary playback device, the stereo bond may be broken, and the playback devices may return to their initial confirmed names. When the primary playback device returns to the network, the stereo bond may be re-established.

In some embodiments, if the audio content is playing from the stereo pair on the home WI-FI network and the primary playback device experiences separation due to a voice assistant and/or alarm bug, the alarm may wake the primary playback device, but not the secondary so bond separation may occur after a period of time with a topology timeout. In some embodiments, if audio content is playing from the stereo pair and the primary playback experiences separation due to a voice assistant and/or alarm bug, audio content may stop on the primary playback device, audio content may continue on the secondary playback device, the stereo bond may be broken, and the playback devices may return to their initial confirmed names. When the primary playback device returns to the network, the stereo bond may be re-established.

In some embodiments, if the audio content is playing from the stereo pair on the home WI-FI network and the secondary playback device goes outside WI-FI range, the audio content may stop on the secondary playback device and the audio content may continue playing on the primary playback device. The stereo bond may be broken and the primary playback device may return to its initial confirmed name (e.g., instead of having the stereo bonded name). When the secondary playback device returns to the WI-FI network, the secondary playback device may also return to its initial confirmed/configured name. At this point, the user may need to manually recreate the stereo bond by specifically using the controller to join the primary and secondary playback devices back to the bonded zone (e.g., recreate the stereo pair). In some embodiments, if the audio content is playing from the stereo pair on the home WI-FI network and the secondary playback device switches to a BLUETOOTH (or other protocol) pairing mode, such as via a button push on the secondary playback device, the audio content may continue playing in stereo. If, on the other hand, the audio content is playing from the stereo pair on the home WI-FI network and a BLUETOOTH connection is established with another device (e.g., another playback device, NMD, or other device), the BLUETOOTH class-connected playback device may display a blue LED light and audio content may continue playing stereo. If audio content is playing from the stereo pair and the secondary playback device establishes a BLUETOOTH connection and a BLUETOOTH audio stream is playing, the BLUETOOTH Classic-connected playback device may display a blue LED light and audio content may continue play in stereo.

In some embodiments, if the audio content is playing from the stereo pair on the home WI-FI network and the secondary playback device establishes an Airplay connection, the bond may not separate, the primary playback device may be the Airplay target for the connection and there may be no delegation of the audio content. In some embodiments, if the audio content is playing from the stereo pair on the home WI-FI network and the secondary playback device establishes a Spotify Direct Control connection, the bond may not separate, the primary may be the Direct Control target, and there may be no delegation of the audio content. In certain embodiments, if the audio content is playing from the stereo pair on the home WI-FI network and the secondary playback device powers off (e.g., via a button push), the audio content may stop on the secondary playback device, the audio content may continue playing on the primary playback device, the stereo bond may be broken, and the primary playback device may return to its initial confirmed name. When the secondary playback device returns to the WI-FI network, the secondary playback device may also return to its initially configured name. At this point, the user may need to manually recreate the stereo bond between the primary and secondary playback devices.

In some embodiments, if audio content is playing from the stereo pair on the home WI-FI network and the secondary playback (i) runs out of battery (enters sleep mode), (ii) experiences a software update and/or reboots, (iii) experiences an unexpected restart of software, (iv) is manually placed into a sleep mode, (v) separates from the stereo bond based on a voice assistant interaction and/or activity, the audio content may stop on the secondary playback device, the audio content may continue playback on the primary playback device, the stereo bond may be broken and both the primary and secondary playback devices may return to their original confirmed name. When the primary playback device returns to the network, the stereo bond may be automatically re-established with the secondary playback device. In certain embodiments, if audio content is playing from the stereo pair on the home WI-FI network and the secondary playback device goes to sleep, such as when an inactivity timeout occurs after a threshold time of idleness (e.g., 30 min of idle time), the audio content may cease playing on the primary playback device and audio content may stop for the secondary playback device after a certain duration buffer. After the heartbeat is lost between the primary and secondary playback devices, a countdown timer may initiate. After a designated amount of time, the stereo bond may now be broken and both the primary and secondary playback devices may return to their default names. if the playback devices regain communication capability with each other before the countdown timer expires, the bond between the devices may be automatically re-established. In some embodiments, if the audio content is playing from the stereo pair on the home WI-FI network and the primary playback device goes to sleep mode within a certain duration after the secondary playback device (e.g., 3 minutes), the following may occur: if both playback devices do not awake from sleep mode after a certain amount of time, a topology timeout may occur and the bond may separate. Audio content may cease on the primary playback device, audio content may continue on the secondary playback device, the stereo bond may be broken, and both speakers may return to their initial confirmed name. When the primary playback device returns to the network, the stereo bond between the primary and secondary playback devices may automatically be re-established.

In some embodiments, if audio content is playing from the stereo pair and both the primary and secondary playback devices move together to continue playing in another location (but still within range of the WI-FI network), the audio content may continue playing in stereo mode. If however, the audio content is playing from the stereo pair and both the primary and secondary playback devices move together outside the WI-FI range, the playback of audio content may cease on both playback devices. After the heartbeat is lost between the playback devices, a countdown timer may initiate. After a designated amount of time, the bond may be broken and both playback devices may return to their default names. At this point, the user will need to manually recreate the stereo bond, such as by utilizing the controller or potentially performing a hardware interaction.

In some embodiments, if no audio content is playing from the stereo pair on the home WI-FI network and the primary playback devices lifts off the charging base or moves several rooms away (but still within WI-FI range), there may be no change to the bond or playback. If no audio content is playing from the stereo pair on the home WI-FI network and the primary playback device goes outside WI-FI range, the audio content may cease on the primary playback device, the audio content may cease on the secondary playback device after a certain time buffer, and after the heartbeat is lost between the playback devices, a countdown timer may start. After a designated amount of time, the stereo bond may be broken and both playback devices may return to their default names. If the playback devices regain communication before the countdown timer expires, the bond may be automatically re-established. If no audio is playing from the stereo pair and the primary playback device switches to BLUETOOTH pairing mode, then audio content may be played. If no audio is playing from the stereo pair and the primary playback device establishes a BLUETOOTH connection with a device, the BLUETOOTH Classic connected playback device (e.g., the primary) may display a blue LED light and audio content may be played. If no audio is playing from the stereo pair, the primary playback device establishes a BLUETOOTH connection with a device, and a BLUETOOTH audio stream is playing, then the BLUETOOTH Classic connected playback device (e.g., the primary) may display a blue LED light and audio content may be played. If no audio is playing from the stereo pair and the primary playback device establishes an Airplay connection, the bond may not separate, and the primary playback device may be the Airplay target. No delegation of audio content may occur in such a scenario. If no audio is playing from the stereo pair and the primary playback device establishes a Direct Control connection, the bond may not separate, the primary playback device may be the Direct Control target, and there may be no delegation for playback of audio content.

If no audio is playing from the stereo pair and the primary playback device powers off, the audio content may cease on the primary playback device, the audio content may cease after a threshold time buffer on the secondary playback device, and after the heartbeat is lost between the playback devices, a countdown timer may start. After a designated period of time, the stereo bond may be broken and both playback devices may return to their default names. If the playback devices regain communication before the countdown timer expires, the bond may be re-established. If no audio is playing from the stereo pair and the primary playback device and a software update for the primary playback device occurs, an unexpected restart of software for the primary playback devices occurs, and/or the battery runs out for the primary playback devices, the audio content may be stopped for both playback devices, and, after the heartbeat is lost between the playback devices, a countdown timer may initiate. After a designed amount of time, the bond may break and the playback devices may return to their default names. The user will then need to manually recreate the bond. If no audio is playing from the stereo pair and the primary playback device goes to sleep (e.g., inactivity timeout after 30 min of idle time), the primary playback device is manually entered into a sleep mode, or a separation occurs due to activity with a voice assistant, audio content may be stopped on the primary playback device, audio content may be stopped after a threshold time buffer for the secondary playback device, and after the heartbeat is lost between the playback devices, a countdown timer may start. After a designated period of time, the stereo bond may be broken and both playback devices may return to their default names. If the playback devices regain communication with each other before the countdown timer expires, the bond may be automatically re-established. In some embodiments, if no audio is playing from the stereo pair and the primary playback device goes to sleep a threshold amount of time (e.g., 3 minutes) after the secondary playback device, the following may occur: if both playback devices do not get woken after a period of time (e.g., 1 min) a topology timeout may occur and the bond may separate. The stereo bond may be broken and both playback devices may return to their initial confirmed names. When the primary playback device returns to the network, the stereo bond may be automatically re-established. If no audio is playing from the stereo pair and the primary playback device is woken from sleep, the secondary playback device may be woken as well.

If no audio is playing from the stereo pair and the secondary playback device lifts off the charging base and/or moves several rooms away (but stays in WI-FI range), there may be no change to the current operation of the playback devices. If no audio is playing from the stereo pair and the secondary playback device goes outside of WI-FI range, audio playback may stay ceased on the secondary playback device, audio content may be played on the primary playback device, the stereo bond may be broken and the primary playback device may return to its initial confirmed name. When the secondary playback device returns to the WI-FI network, it may also return to its initially configured name. The user will then need to recreate the bond between the devices. If no audio is playing from the stereo pair and the second playback device switches to BLUETOOTH pairing mode, then audio content may be played. If no audio is playing from the stereo pair and the secondary playback device establishes a BLUETOOTH connection with a device, the BLUETOOTH Classic connected playback device (e.g., the secondary) may display a blue LED light and audio content may be played. If no audio is playing from the stereo pair, the secondary playback device establishes a BLUETOOTH connection with a device, and a BLUETOOTH audio stream is playing, then the BLUETOOTH Classic connected playback device (e.g., the secondary) may display a blue LED light and audio content may be played. If no audio is playing from the stereo pair and the secondary playback device establishes an Airplay connection, the bond may not separate, and the secondary playback device may be the Airplay target. No delegation of audio content may occur in such a scenario. If no audio is playing from the stereo pair and the secondary playback device establishes a Direct Control connection, the bond may not separate, the secondary playback device may be the Direct Control target, and there may be no delegation for playback of audio content.

If no audio is playing from the stereo pair and the secondary playback device powers off, runs out of battery, and/or experiences a software update, then the second playback device may not play audio content, the primary playback device may play audio content, the stereo bond may be broken, and the primary playback device may return to its original confirmed name. When the secondary playback device returns to the WI-FI network and can communicate, the secondary playback device may also return to its initially configured name. The user may then need to manually recreate the bond. If no audio is playing from the stereo pair and the secondary playback device experiences an unexpected software restart, the secondary playback device goes to sleep after a threshold amount of idle time, or the secondary playback device is manually entered into a sleep mode, audio content may be ceased on the primary playback device, audio content may be ceased after a threshold time buffer for the secondary playback device, and after the heartbeat is lost between the playback devices, a countdown timer may start. After a designated amount of time, the stereo bond may be broken and both the playback devices may return to their default naming. If the playback devices regain communication before the countdown timer expires, the bond may be automatically re-established. If no audio is playing from the stereo pair and the primary playback devices goes to sleep after a threshold amount of time after the secondary playback device, the following may occur: if both playback devices do not get woken after a period of time, a topology timeout and separation may occur. The playback of audio content may cease on the primary playback device, audio content may be played on the secondary playback device, the stereo bond may be broken, and both playback devices may return to their initial confirmed name. When the primary playback device returns to the network, the bond may automatically be re-established. If the secondary playback device is woken from sleep, the primary playback device may be woken up.

If no audio is playing from the stereo pair and both playback devices move together, but are within WI-FI range, there may be no change to the playback device operation. If no audio is playing from the stereo pair and both playback devices go outside of WI-FI range, then playback may stay ceased on both playback devices, and, after the heartbeat is lost between the speakers, a countdown timer may start. After a designated amount of time, the bond may be broken and both playback devices may be returned to their default naming. When the playback devices regain communication with each other, they will automatically re-establish their stereo bond. If no audio is playing from the stereo pair and both playback devices are woken from sleep, then when a playback device is woken from sleep, a wake up command may be sent to the other playback device in the bond.

In some embodiments, there are certain conditions, which may automatically re-establish a stereo bond. For example, if a software update causes a bond separation. If there was an active audio stream that may be delegated at the time of bond separation, the playback may be resumed when the devices re-bond. As another example, a bye bye command may be received by a stereo pair before disconnection. If there was an active audio stream that may be delegated at the time of bond separation, then playback of audio content may be resumed when the playback devices re-bond. A stereo bond may also be automatically re-established after a BLUETOOTH line-in connection is made. In some embodiments, if an accelerometer event occurs, a prior topology timeout occurs, and no bye bye message is received, then a stereo bond may not be re-established.

Figure 8:
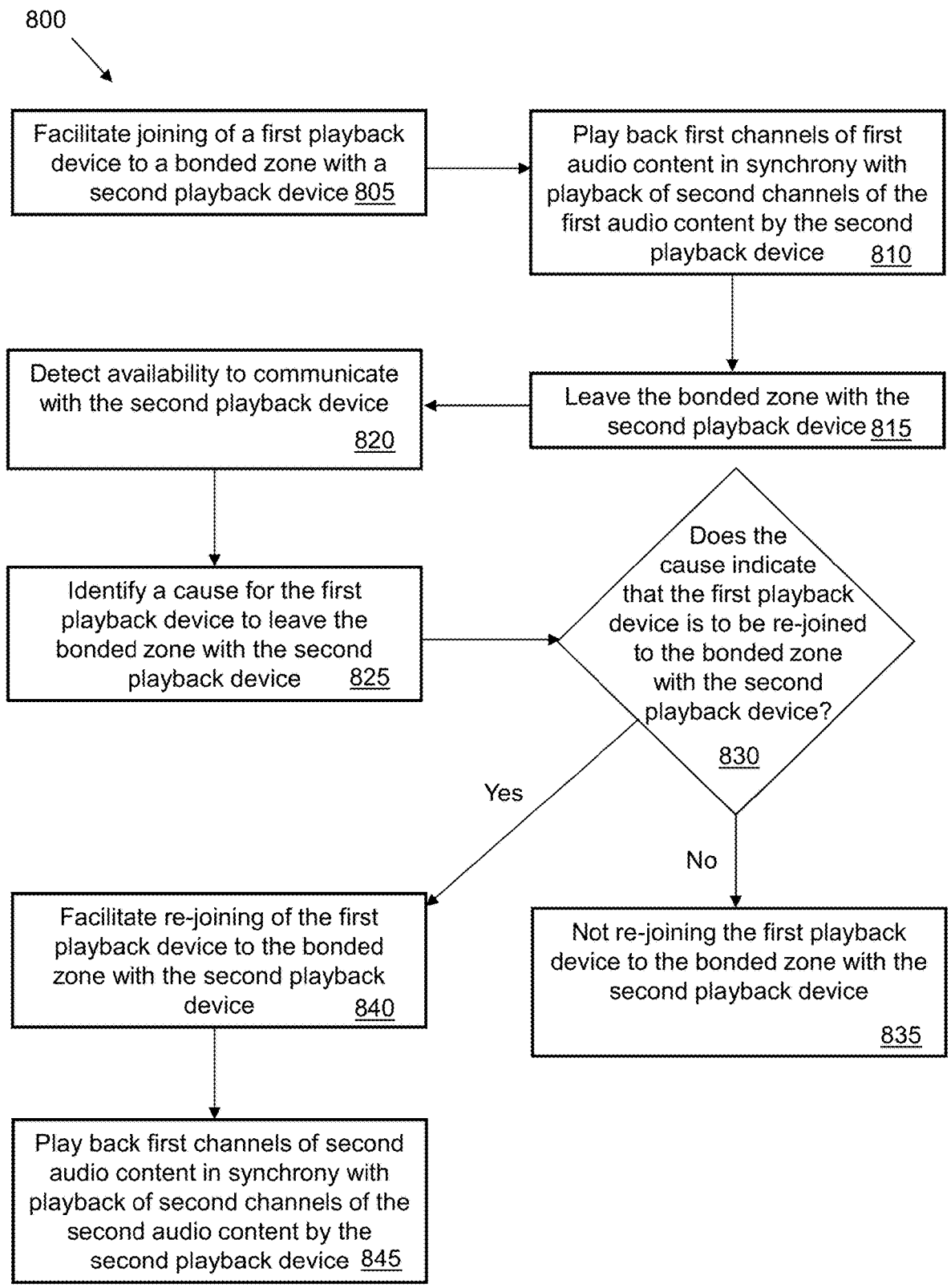
FIG. 8 illustrates a flow diagram for facilitating stereo re-bonding of playback devices to a bonded zone according to exemplary embodiments.

Referring now to FIG. 8, a flow diagram of a method 800 for facilitating re-bonding of playback devices to a bonded zone is illustrated. In particular, the method 800 may be utilized to facilitate re-bonding of playback devices to a bonded zone depending on the cause for the playback devices leaving the bonded zone on a previous occasion. For example, the cause for a playback device leaving a bonded zone may include, but is not limited to, (i) the playback device powering down, (ii) the playback device losing a connection to a network supporting the bond with at least one other playback device, (iii) the playback device connecting with a device outside the bonded zone, (iv) the playback device battery level falling below a threshold power value, (v) the playback device moving outside a communication range for communicating with another playback device bonded with the playback device, (vi) a software update associated with updating software facilitating operation and/or control of the playback device occurring, (vii) the playback device entering into a sleep or inactivity mode, (viii) a sensor event occurring (e.g., an accelerometer event (e.g., accelerometer indicates a certain type of motion of duration of motion), gyroscope event, any type of sensor event, etc.), and (ix) other types of causes.

In certain embodiments, additional information (e.g., contextual information) in addition to the cause of the bond being broken may be factored in as well by the method 800. For example, (i) an indication of which playback device(s) are playing back audio content at the time when the playback devices come back into communication (e.g., are the playback devices playing back two separate streams, are one or both of the playback devices idle, etc.); (ii) an indication as to the type of bonded zone that the playback devices were a part of (e.g., whether the bonded zone a stereo pair setup, home theater setup, or other type of setup); (iii) an indication as to the context relating to the bond being broken between the playback devices; (iv) an indication as to actions being performed with respect to the playback devices; and/or (v) and other factors may be factored using the method 800 to determine whether to re-bond a playback device to a bonded zone. In particular, depending on the cause for the bond between or among playback devices being broken and/or depending on additional relevant contextual information, the method 800 may either opt to automatically re-join a playback device to the bonded zone when the playback device is able to communicate with one or more playback devices previously in the bonded zone or may opt to prevent the playback device from automatically re-joining the bonded zone. By providing such functionality, the method 800 substantially enhances the user experience when interacting with playback devices and listening to playback of media content output by such playback devices.

To such accomplish such ends, the method 800 may include, at step 805 facilitating joining of a first playback device (e.g., playback device 7101) to a bonded zone (e.g., bonded zone 707a) with a second playback device (e.g. playback device 710m). In certain embodiments, the bonded zone may comprise a stereo pair setup where the first playback device is utilized for left audio channels of multi-channel audio content and the second playback device is utilized for right audio channels of the multi-channel audio content. In certain embodiments, the bonded zone may comprise a home theater setup where the first and second playback devices comprise surround or satellite channels for content being output. In certain embodiments, the bonded zone may comprise other types of groupings of playback devices, such as devices grouped by location, type of content, common functionality, compatible functionality, and/or any other type of grouping. Once the first playback device is joined to the bonded zone with the second playback device, the method 800 may include, at step 810, facilitating playback by the first playback device of first channels of first audio content in synchrony with second channels of the first audio content by the second playback device. For example, at step 810, the method 800 may include having the first playback device play back left channel audio content (e.g. a digital song) and the second playback device play back right channel audio content when the first and second playback devices are bonded together as a stereo pair.

At step 815, the method 800 may include having one or more of the playback devices leave the bonded zone. For example, at step 815, the method 800 may include having the first playback device leave the bonded zone based on a powering down of the first or second playback device, based on the first playback device disconnecting from a network facilitating the bond with the second playback device, and/or based on other reasons. Such other reasons may include, but are not limited to, the first playback device resetting, the first playback device going through a software update, the first playback device establishing a connection with a device outside the bonded zone, the first playback device entering a sleep mode or having a threshold amount of inactivity, the first playback device moving in a certain manner or a threshold distance away from the second playback device (e.g. outside communication range), and/or other reasons. After the first playback device has departed the bonded zone with the second playback device, the method 800 may proceed to step 820, which may include determining availability of the first communication device to communicate with the second playback device. For example, if the first playback device left the bonded zone because the first playback device was moved beyond a communication range of a WLAN connecting the first and second playback devices together, when the first playback device gets back into communication range of the WLAN, the first playback device may be able to communicate with the second playback device.

At step 825, the method 800 may include identifying the specific cause for the first playback device to leave the bonded zone at step 815. For example, the specific cause may be that the first playback device moved outside a threshold range for communicating with the second playback device via a WLAN. As another example, the specific cause may be that the first playback device. In some embodiments, the cause may be determined based on data associated with the first and second playback devices when the first and/or second playback devices leave the bonded zone. For example, if the first playback device leaves the bonded zone, the first playback device and/or a media playback system including the first playback device (or communicating with the first playback device) may store data associated with the first playback device before, during, and/or after leaving the bonded zone. Such data may include, but is not limited to, sensor data obtained from sensors of the first playback devices (e.g., accelerometer data indicating motion of the first playback device), information from communication components of the first playback device (e.g. the first playback device connected with a device outside the bonded zone, which caused the first playback device to leave the bonded zone), information identifying inputs and/or outputs made with respect to the first playback device (e.g., did a certain data transmission occur; was the power button depressed; did the user select an option via an application controlling the first playback device to leave the bonded zone; etc.). Similarly, similar data associated with the second playback device may also be stored by the playback devices and/or a media playback system associated with the playback devices.

At step 830, the method 800 may include determining whether, based on the identified cause, that the first playback device is to be re-joined to the bonded zone with the second playback device. For example, in certain embodiments, exemplary causes (e.g., causes for the previous bond to be broken) that may warrant automatic re-joining of the first playback device to the bonded zone with the second playback device may include, but are not limited to, (i) occurrence of a software update, (ii) receipt of a bye bye command associated with leaving the bonded zone, (iii) establishment of a BLUETOOTH line-in connection by the first playback device, the second playback device, or both, (iv) a powering down of the playback device, (v) entering into a sleep mode or inactivity mode, (vi) the battery level of the first playback device, second playback device, or both, being below a threshold value, and/or (vii) any other cause warranting re-bonding. In certain embodiments, exemplary causes that may not warrant automatic re-bonding of the first playback device to the bonded zone with the second playback device may include, but are not limited to, (i) the user specifically broke the bond, such as via a controller application utilized to control the first and/or second playback devices, (ii) loss of a connection to a network associated with the bonded zone, (iii) the first playback device and/or second playback device moved outside a communication range of the bonded zone and/or network supporting connectivity for the bonded zone, and/or (iv) any other cause not warranting re-bonding to the bonded zone.

In certain embodiments, the causes that warrant re-bonding or not re-bonding may be coded into the software supporting the functionality of the playback devices, the media playback systems associated with the playback devices, other devices, or a combination thereof. In certain embodiments, whether a cause warrants re-bonding or not may be adjusted by a user based on preferences. In some embodiments, whether a cause for a prior breakage of a bond warrants re-bonding or not may be modified based on the training of artificial intelligence models that facilitate the decision making in this regard. For example, if over time, the artificial intelligence models learn that a user regularly re-bonds the first and second playback devices after the first playback device comes back in communication range with the second playback device, the artificial intelligence models may override (or prompt the user to accept an override) the coded instructions to not automatically re-bond the first playback device and second playback device when the first playback device comes back in communication range with the second playback device.

If, at step 830, the method 800 determines that the cause for the previous departure from the bonded zone does not indicate that the first playback device is to be re-joined to the bonded zone with the second playback device, then the method 800 may proceed to step 835. At step 835, the method 800 may include not re-joining (or preventing) the first playback device to the bonded zone with the second playback device. If, however, at step 830, the method 800 determines that the cause for the previous departure from the bonded zone warrants re-bonding of the first playback device to the bonded zone with the second playback device, the method 800 may proceed to step 840. At step 840, the method 800 may include facilitating re-joining of the first playback device to the bonded zone with the second playback device. For example, the stereo pair relationship (or home theater, group, or other relationship) may be re-established between the first and second playback devices. Once the first playback device is re-joined to the bonded zone with the second playback device, the method 800 may proceed to step 845. At step 845, the method 800 may include playing back first channels of second audio content in synchrony with playback of second channels of the second audio content. For example, the first playback device may be configured to play the first channels of a song and the second playback device may be configured to play second channels of the same song. Notably, the method 800 may be repeated as necessary as bonds are created and broken over time between and/or among any number of playback devices, media playback systems. Moreover, the method 800 may also incorporate any of the functionality and features as described in the present disclosure to further enhance the method 800 and/or adjust the functionality supported by the method 800.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. The se process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method for a first playback device, the method comprising:
    joining, with the first playback device, a bonded zone that includes at least a second playback device;
    while in the bonded zone with the second playback device, playing back, by the first playback device, audio content in synchrony with playback of the audio content by the second playback device;
    leaving, with the first playback device, the bonded zone;
    after leaving the bonded zone, with the first playback device:
        (i) detecting availability to communicate with the second playback device;
        (ii) identifying a cause for leaving the bonded zone with the second playback device;
        (iii) after detecting the availability to communicate with the second playback device, determining, based on the cause for leaving the bonded zone, whether to re-join the bonded zone with the second playback device; and
        (iv) when it is determined, based on the cause for leaving the bonded zone, that the first playback device is to re-join the bonded zone with the second playback device, re-joining, by the first playback device, the bonded zone with the second playback device and playing back, with the first playback device, audio content in synchrony with playback of the audio content by the second playback device.

2. The method of claim 1, wherein playing back, with the first playback device, audio content in synchrony with playback of audio content by the second playback device comprises playing back, with the first playback device, one or more first channels of first audio content in synchrony with playback of one or more second channels of the first audio content by the second playback device.

3. The method of claim 1, further comprising, after detecting the availability to communicate with the second playback device, preventing re-joining the bonded zone with the second playback device when the cause for leaving the bonded zone indicates that the first and second playback devices are not to re-join the bonded zone.

4. The method of claim 1, further comprising storing, by one of the first playback device, the second playback device, and a third device in communication with at least one of the first and second playback devices, the cause for leaving the bonded zone,
    wherein identifying the cause for leaving the bonded zone comprises accessing, by the first playback device, the stored cause for leaving the bonded zone.

5. The method of claim 1, wherein determining whether to re-join the bonded zone comprises determining, by the first playback device, to re-join the bonded zone with the second playback device when the cause for leaving the bonded zone with the second playback device comprises one or more of:
    (i) a powering down of the first playback device or the second playback device,
    (ii) a loss of a connection by the first playback device or the second playback device to a network,
    (iii) the bonded zone was separated by a user of the first or second playback device,
    (iv) a software update to the first playback device or the second playback device,
    (v) a depleted battery of the first playback device or the second playback device,
    (vi) the first playback device or the second playback device enter into a sleep mode,
    (vii) the first playback device and the second playback device are a threshold distance apart from each other,
    (viii) losing communication capability with the second playback device, or
    (ix) receiving an input from the user.

6. The method of claim 1, wherein determining whether to re-join the zone with the second playback device comprises:
    determining, by the first playback device, that the cause for leaving the bonded zone warrants automatic re-joining of the first playback device to the bonded zone; and
    determining, by the first playback device, whether to re-join the bonded zone with the second playback device based on whether the first playback device and the second playback device are currently playing back same or different audio content.

7. The method of claim 1, wherein determining whether to re-join the zone with the second playback device comprises:
    determining, by the first playback device, that the cause for leaving the bonded zone warrants automatic re-joining of the first playback device to the bonded zone; and
    determining, by the first playback device, to re-join the bonded zone with the second playback device based on the bonded zone comprising a bonded zone in which the first and second playback devices play back one or more first and one or more second channels of the audio content, respectively.

8. The method of claim 1, wherein determining whether to re-join the zone with the second playback device comprises:
    determining, by the first playback device, that the cause for leaving the bonded zone warrants automatic re-joining of the first playback device to the bonded zone; and re-joining, by the first playback device, the bonded zone based on the bonded zone comprising one of a stereo pair setup or a home theater setup.

9. The method of claim 1, further comprising determining a first voice assistant service assigned to the first playback device and a second voice assistant service assigned to the second playback device.

10. The method of claim 9, further comprising, when the first playback device has re-joined the bonded zone with the second playback device, activating at least one of the first and second voice assistant services.

11. The method of claim 1, further comprising delegating playback of the audio content when the first playback device leaves the bonded zone after re-joining the bonded zone.

12. The method claim 1, further comprising playing back, with the first playback device, all channels of audio content alone after leaving the bonded zone and before re-joining the bonded zone with the second playback device.

13. The method of claim 1, further comprising determining, when the first playback device is to re-join the bonded zone with the second playback device and when one or both of the first or second playback devices are playing back audio content, content to be played back in synchrony between the first and second playback devices.

14. A first playback device, comprising:
one or more amplifiers;
one or more processors; and
at least one non-transitory computer-readable medium comprising program instructions that are executable by the one or more processors such that the first playback device is configured to perform a method comprising
joining a bonded zone with a second playback device,
while in the bonded zone with the second playback device, playing back audio content in synchrony with playback of the audio content by the second playback device,
leaving the bonded zone with the second playback device, after leaving the bonded zone:
(i) detecting availability to communicate with the second playback device;
(ii) identifying a cause for leaving the bonded zone with the second playback device;
(iii) determining, based on the cause for leaving the bonded zone, whether to re-join the bonded zone with the second playback device; and
(iv) when it is determined, based on the cause for leaving the bonded zone, that the first playback device is to re-join the bonded zone with the second playback device, re-joining the bonded zone with the second playback device and playing back audio content in synchrony with playback of the audio content by the second playback device.

15. The first playback device of claim 14, wherein determining whether to re-join the bonded zone comprises determining to re-join the bonded zone with the second playback device based on determining that the cause for leaving the bonded zone with the second playback device comprises one or more of
(i) a powering down of the first playback device or the second playback device,
(ii) a loss of a connection by the first playback device or the second playback device to a network,
(iii) the bonded zone was separated by a user of the first or second playback device,
(iv) a software update,
(v) a depleted battery of the first playback device or the second playback device,
(vi) the first playback device or the second playback device enter into a sleep mode,
(vii) the first playback device and the second playback device are a threshold distance apart from each other,
(viii) losing communication capability with the second playback device, or
(ix) receiving an input from the user.

16. The first playback device of claim 14, wherein the method further comprises:
when the first playback device is re-joined to the bonded zone with the second playback device, activating a voice assistant service of the first playback device.

17. The first playback device of claim 14, wherein playing back audio content in synchrony with playback of audio content by the second playback device comprises playing back one or more first channels of first audio content in synchrony with playback of one or more second channels of the first audio content by the second playback device.

18. A tangible, non-transitory computer-readable medium comprising instructions, which, when executed by one or more processors, causes a first playback device to be configured to cause the first playback device to perform a method comprising:
joining a bonded zone with a second playback device;
while in the bonded zone with the second playback device, playing back audio content in synchrony with playback of the audio content by the second playback device;
leaving the bonded zone with the second playback device; after leaving the bonded zone:
(i) detecting availability to communicate with the second playback device;
(ii) identifying a cause for leaving the bonded zone with the second playback device;
(iii) determining, based on the cause for leaving the bonded zone, whether to re-join the bonded zone with the second playback device; and
(iv) when it is determined, based on the cause for leaving the bonded zone, that the first playback device is to re-join the bonded zone with the second playback device, re-joining the bonded zone with the second playback device and playing back audio content in synchrony with playback of the audio content by the second playback device.

* * * * *